(12) United States Patent
Kashihara et al.

(10) Patent No.: US 6,704,259 B2
(45) Date of Patent: Mar. 9, 2004

(54) INFORMATION RECORDING AND REPRODUCING APPARATUS AND INFORMATION RECORDING AND REPRODUCING METHOD, INFORMATION REPRODUCING APPARATUS AND INFORMATION REPRODUCING METHOD, AND INFORMATION RECORDING MEDIUM

(75) Inventors: Yutaka Kashihara, Fuchu (JP); Yutaka Okamoto, Chofu (JP); Chosaku Noda, Kawasaki (JP); Hideo Ando, Hino (JP); Koichi Hirayama, Ichikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 281 days.

(21) Appl. No.: 09/888,597

(22) Filed: Jun. 26, 2001

(65) Prior Publication Data

US 2002/0036960 A1 Mar. 28, 2002

(30) Foreign Application Priority Data

Jun. 27, 2000 (JP) ......................................... 2000-193209

(51) Int. Cl.[7] .............................. G11B 20/10; G11B 5/35
(52) U.S. Cl. ................. 369/47.27; 369/47.25; 369/53.35; 369/59.22; 360/65

(58) Field of Search ............................ 369/47.25, 47.26, 369/47.27, 53.35, 59.15, 59.16, 59.17, 59.22

(56) References Cited

U.S. PATENT DOCUMENTS 5,623,474 A * 4/1997 Oshio et al. .............. 369/47.15

FOREIGN PATENT DOCUMENTS

| JP | 7-220398 | 8/1995 |
| JP | 9-63201 | 3/1997 |
| JP | 9-82025 | 3/1997 |

* cited by examiner

Primary Examiner—Nabil Hindi
Assistant Examiner—Jorge L. Ortiz-Criado
(74) Attorney, Agent, or Firm—Oblon, Spivak, McClelland, Maier & Neustadt, P.C.

(57) ABSTRACT

There are provided a modulation table, a selector, and a counter. The modulation table is used for creating a plurality of modulation data candidates with respect to a mixture of user data and training data. The selector selects modulation data candidates. The counter counts DSVs for the selected modulation data and controls the selector. The DSV output from this counter is set to a specified value by keeping a state in which the training data is input.

14 Claims, 23 Drawing Sheets

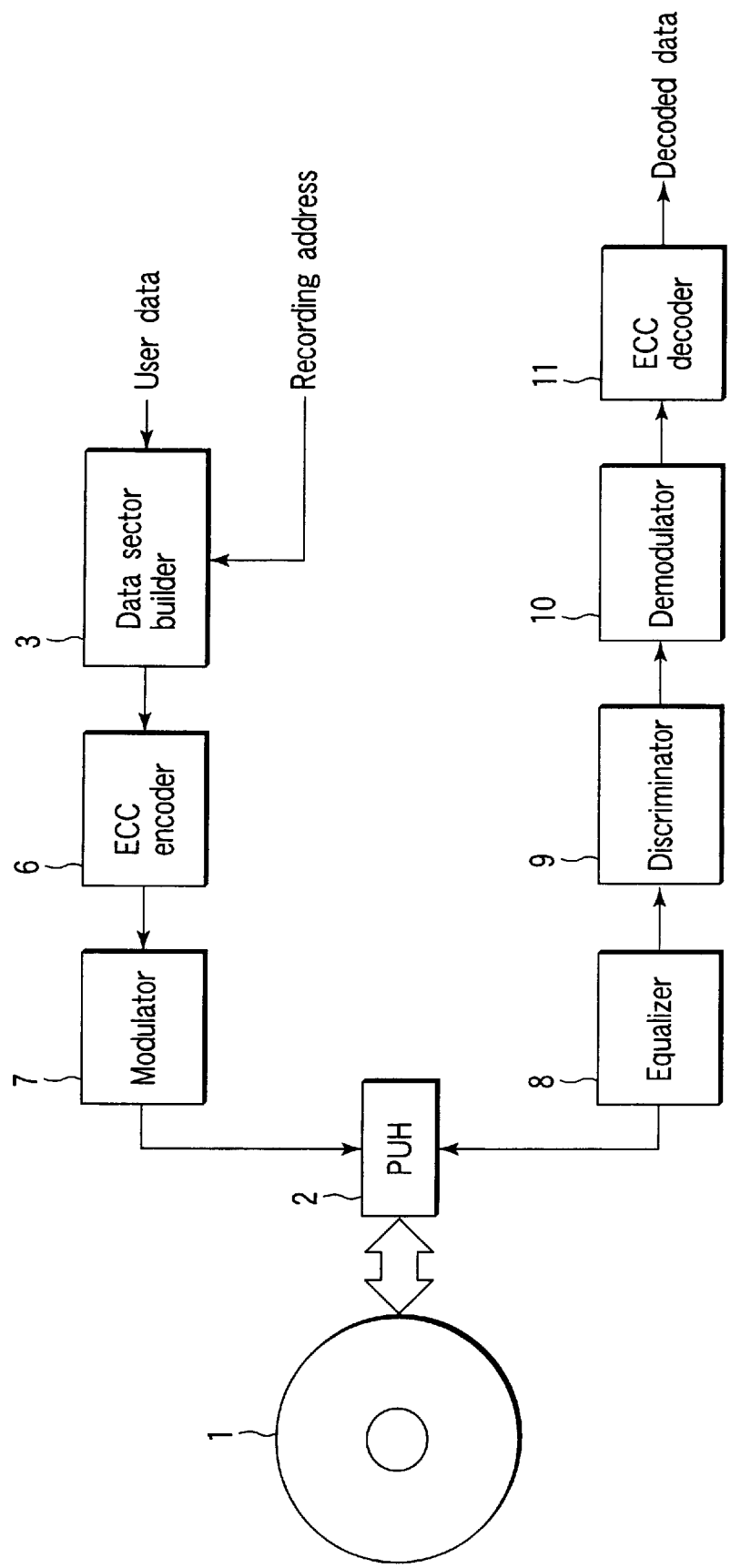
F I G. 1

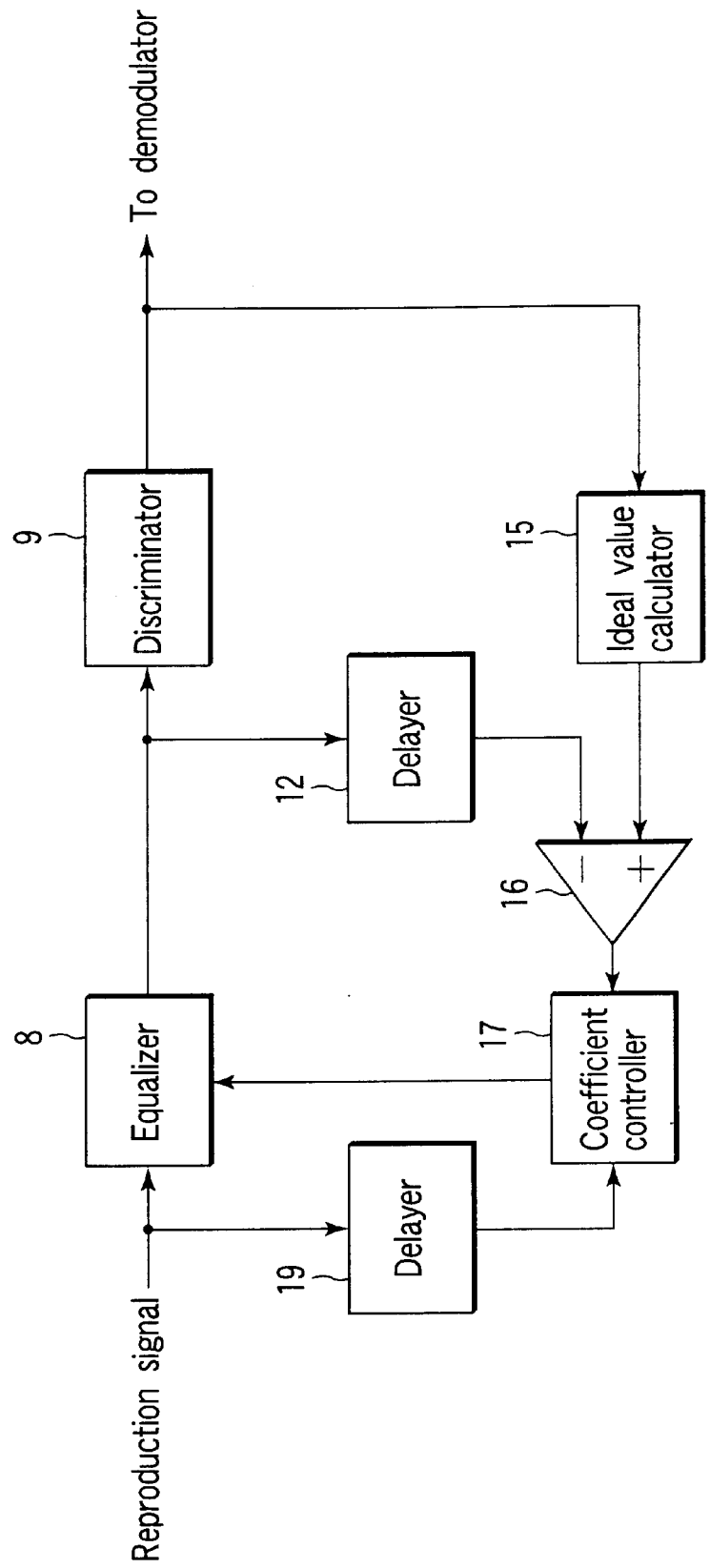
F I G. 12

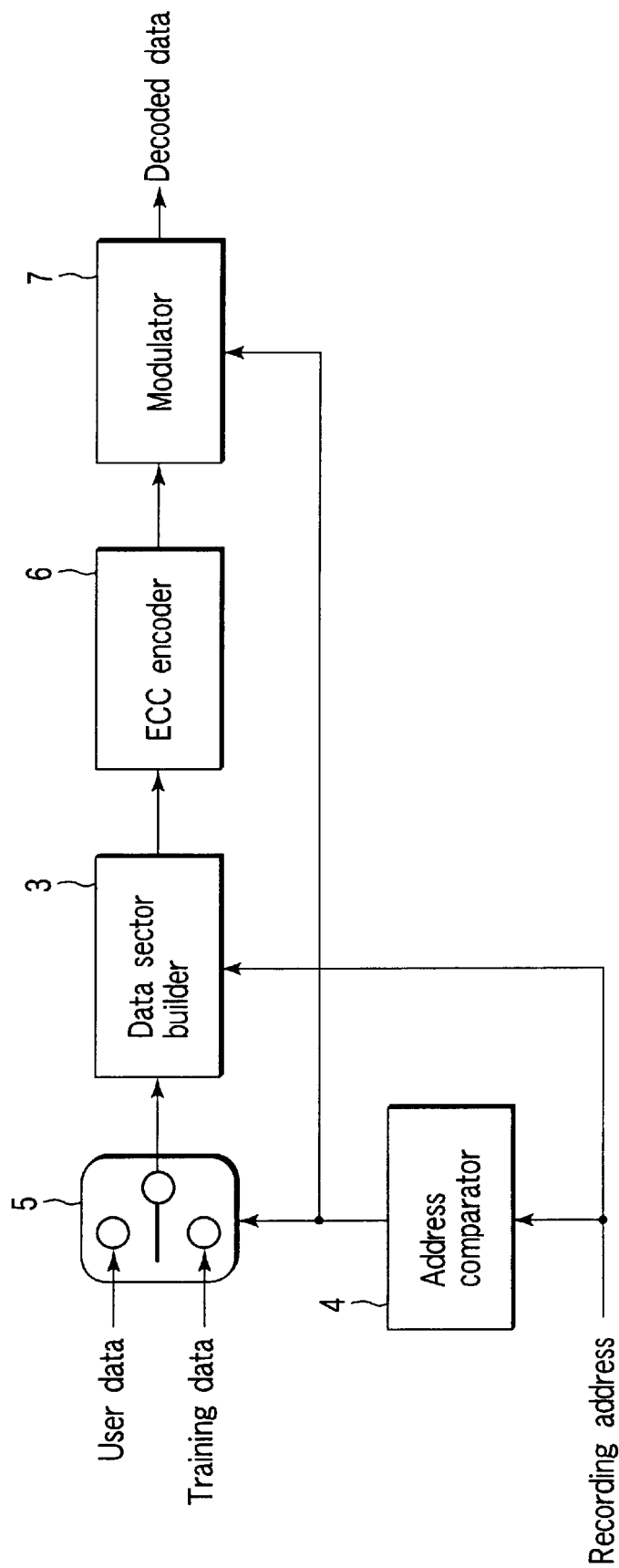
F I G. 13

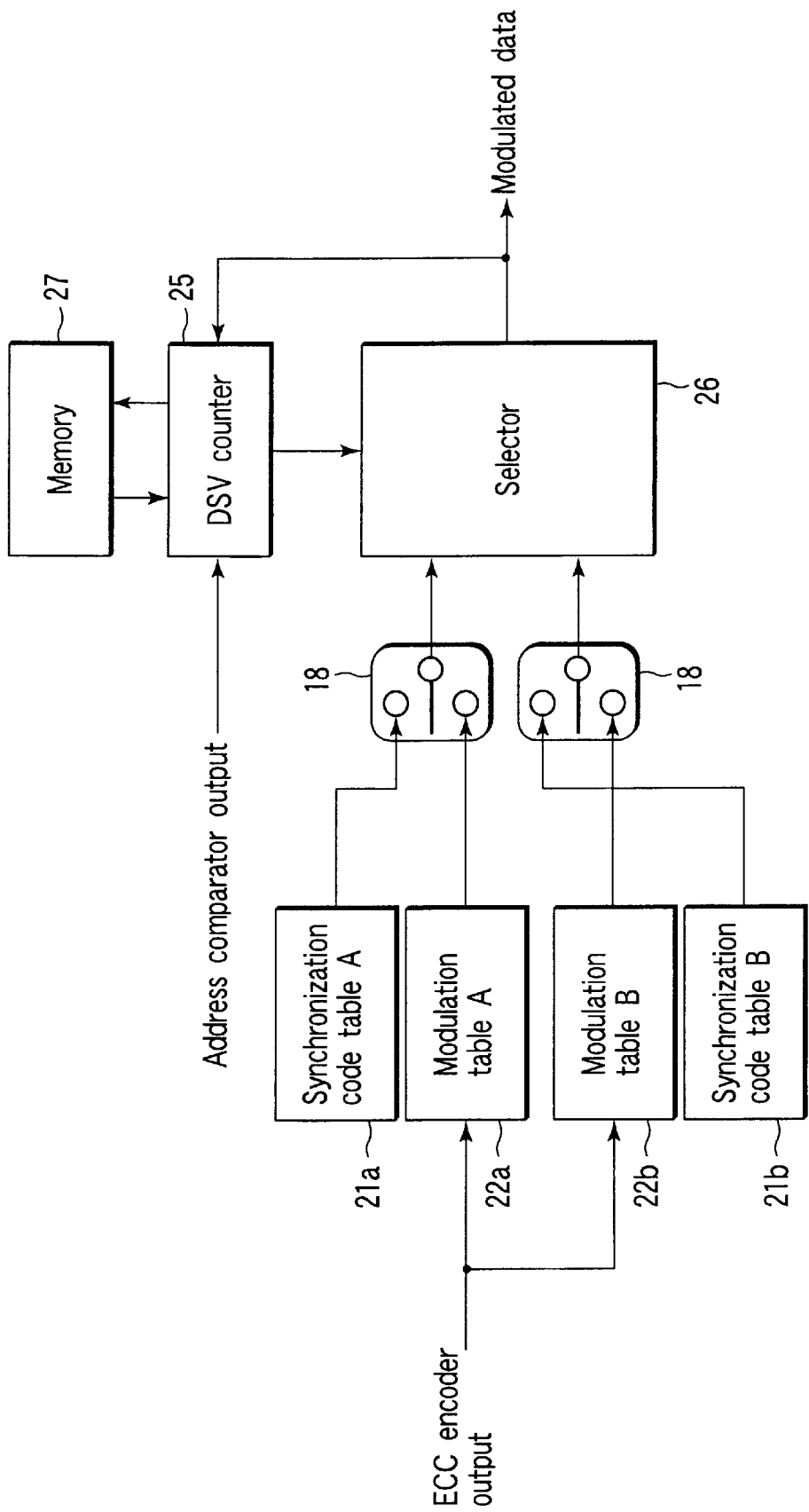
F I G. 15

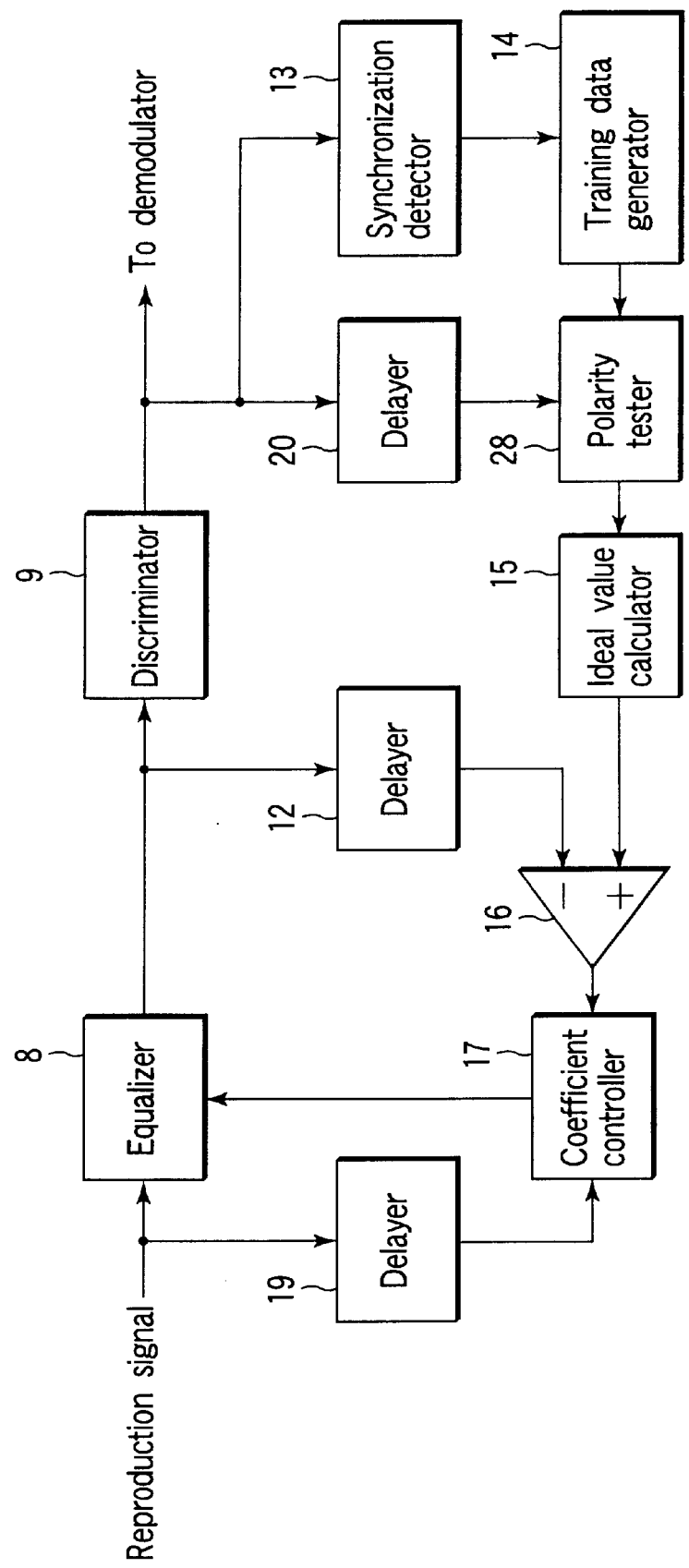
F I G. 20

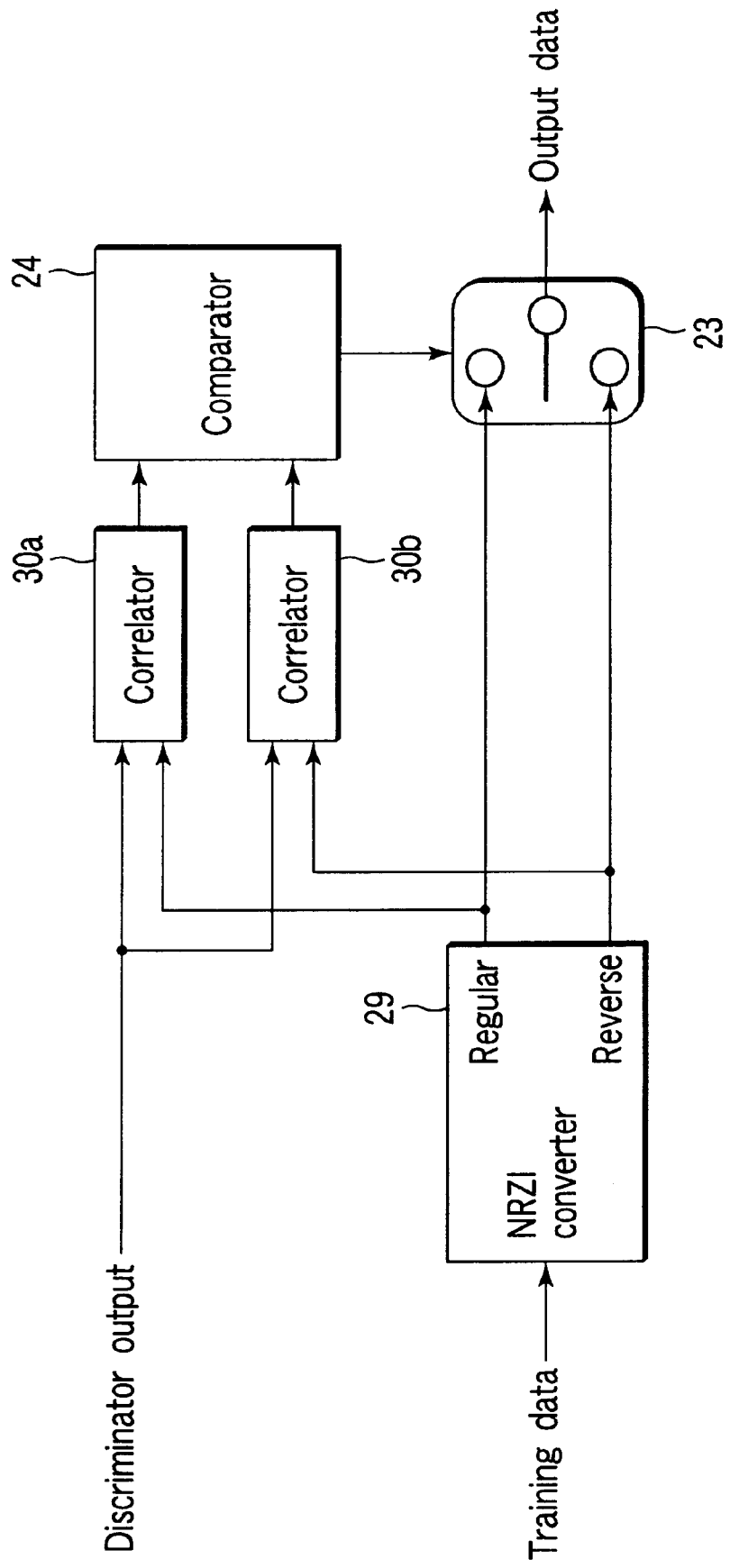
F I G. 21

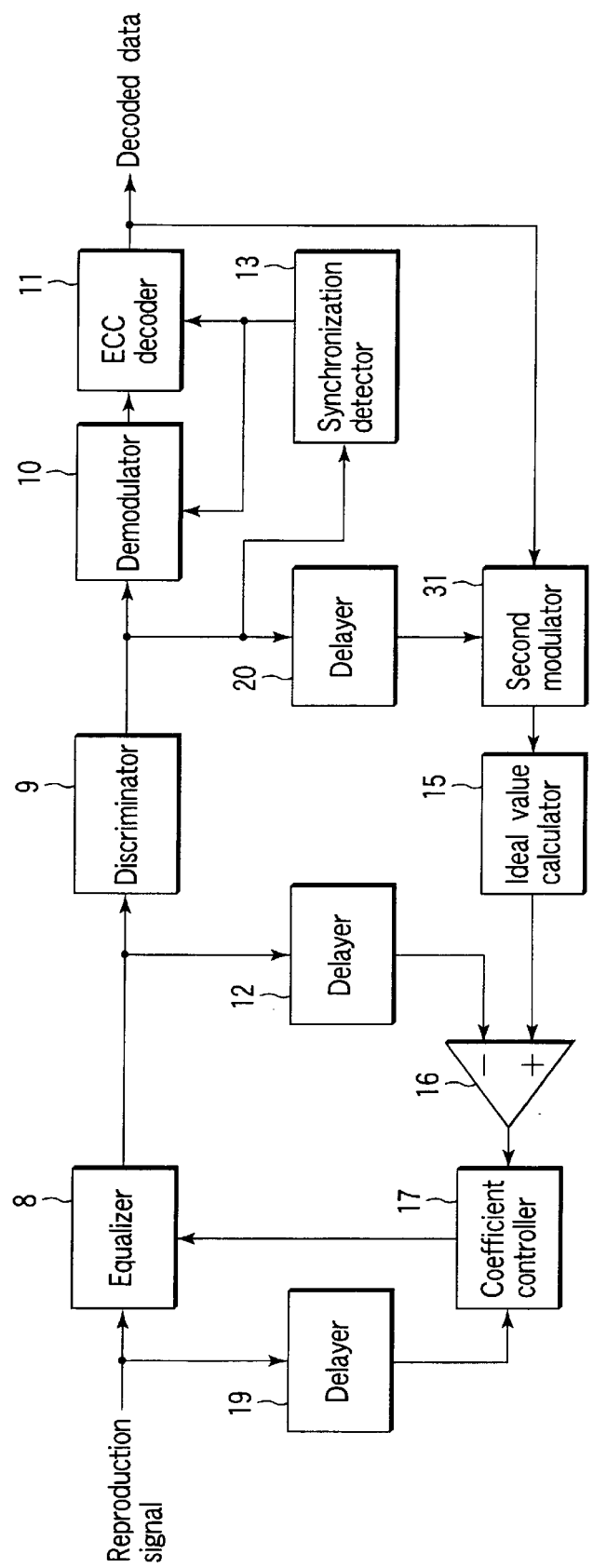
F I G. 22

INFORMATION RECORDING AND REPRODUCING APPARATUS AND INFORMATION RECORDING AND REPRODUCING METHOD, INFORMATION REPRODUCING APPARATUS AND INFORMATION REPRODUCING METHOD, AND INFORMATION RECORDING MEDIUM

CROSS-REFERENCE TO RELATED APPLICATIONS

This application is based upon and claims the benefit of priority from the prior Japanese Patent Application No. 2000-193209, filed June 27, 2000, the entire contents of which are incorporated herein by reference.

BACKGROUND OF THE INVENTION

The present invention relates to improvement of an information recording and reproducing apparatus and an information recording and reproducing method for recording and reproducing digital information, say, on an optical disk. Further, the present invention relates to improvement of an information reproducing apparatus and an information reproduction method for reproducing digital information recorded on, say, an optical disk. Moreover, the present invention relates to an information recording medium such as an optical disk for recording, say, digital information.

It is well known that a DVD system is spreading. The DVD system reproduces digital information (movies, voice, and the like) equivalent to the reproduction time of 2 hours or more. The digital information is compressed and recorded on one side of a 12 cm diameter optical disk by using the MPEG (Moving Picture Image Coding Experts Group)-2 encoding.

The current DVD system standard specifies a recording capacity of 4.7 GB (gigabytes) on one side of an optical disk, a track density of 0.74 $\mu$m per track, and a linear density of 0.267 $\mu$m per bit. In the following description, a DVD system based on this DVD standard is referred to as the current DVD system.

When reading an analog reproduction signal from an optical disk, the current DVD system uses an equalizer to amplify high-frequency components for correctly and accurately converting this signal to digital information and decreasing error occurrences.

Conventionally, the equalizer characteristic is fixed. Recently, as disclosed in Jpn. Pat. Appln. KOKAI Publication No. 9-82025 and the like, there is provided a feature called the adaptive equalization. It automatically controls to optimize the equalizer characteristic according to an optical disk characteristic.

However, the adaptive equalization means disclosed in this KOKAI Publication reads the number of C1 errors according to error correcting codes and controls the equalizer's tap coefficient by means of the hill-climbing control. Since a specified period is needed for monitoring an error occurrence situation, it is difficult to realtime control the equalizer characteristic.

Conventionally, the waveform slice method has been widely used for realtime controlling the equalizer characteristic. Currently, the PRML (Partial Response and Maximum Likelihood) method is increasingly used as a solution for decreased SNR (Signal to Noise Ratio) of the reproduction signal.

The reproduction signal processing method such as PRML performs waveform equalization based on an amplitude level of the reproduction signal. According to a technique developed for this reproduction signal processing method, known training data is recorded on a recording medium. When reproducing the training data causes an equalization error, this error is used for recording medium evaluation or circuit adjustment reference.

A system using the training data for evaluating recording media or adjusting circuits is just in a developmental stage. For example, there is the problem that relation between a training data pattern and ordinary data may prevent full circuit adjustment or accurate recording medium evaluation.

BRIEF SUMMARY OF THE INVENTION

The present invention has been made in consideration of the foregoing. It is therefore an object of the present invention to provide information recording and reproducing apparatus and information recording and reproducing method, information reproducing apparatus and information reproducing method, and information recording medium capable of solving the problems due to conventional training data and performing full circuit adjustment and accurate recording medium evaluation.

An information recording and reproducing apparatus according to the present invention comprises:

recording section having first selection section for selecting user data and training data based on a recording address, modulation section for creating a plurality of modulation data candidates with respect to data selected by this first selection section, second selection section for selecting various modulation data candidates created by this modulation section, a counter for counting DSVs in modulation data selected by this second selection section, and control section for setting a DSV output from this counter to a specified value with the training data selected by the first selection section, wherein the recording section records modulation data selected by the second selection section on an information recording medium; and reproduction section having equalization section for equalizing a reproduction signal read from the information recording medium based on an equalization coefficient, discrimination section for discriminating output from this equalization section, training data generation section for outputting predetermined training data based on output from this discrimination section, polarity test means for testing a polarity of training data output from this training data generation section based on output discrimination data of the discrimination section, ideal signal generation section for generating an ideal signal when relevant training data is ideally equalized from output of this polarity test section, operation section for computing an equalization error based on output from this ideal signal generation section and output from the equalization section, and coefficient control section for generating an equalization coefficient supplied to the equalization section based on output from this operation section and a reproduction signal input to the equalization section.

An information recording and reproducing method according to the present invention comprises:

a recording step having a first step of selecting user data and training data based on a recording address, a second step of creating a plurality of modulation data candidates with respect to data selected by this first step, and a third step of counting DSVs in single modulation data selected from various modulation data candidates created at this second step to control selection of the various modulation data candidates and setting the counter for counting DSVs to a specified value with training data selected at the first step, wherein the recording step records modulation data selected at the third step on an information recording medium; and a reproduction step having a fourth step of equalizing a reproduction signal read from the information recording medium based on an equalization coefficient, a fifth step of discriminating an equalization signal obtained at this fourth step, a sixth step of outputting predetermined training data based on discrimination data obtained at this fifth step, a seventh step of testing a polarity of training data output from this sixth step based on output discrimination data obtained at the fifth step, an eighth step of generating an ideal signal when relevant training data is ideally equalized from training data obtained at the seventh step, a ninth step of computing an equalization error based on an ideal signal obtained at this eighth step and an equalization signal obtained at the fourth step, and a tenth step of generating an equalization coefficient supplied to the fourth step based on an equalization error obtained at this ninth step and a reproduction signal before processing at the fourth step.

An information reproducing apparatus according to the present invention reproduces digital data recorded on an information recording medium, comprising:

an equalization section for equalizing a reproduction signal read from the information recording medium based on an equalization coefficient, a discrimination section for discriminating output from this equalization section, an error correction section for correcting an error in output from this discrimination section, a modulation section for creating a plurality of modulation data candidates for output from this error correction section and, out of this plurality of modulation data candidates, outputting modulation data having practically a higher correlation with discrimination data obtained from the discrimination section, an ideal signal generation section for generating an ideal signal when modulation data output from this modulation section is ideally equalized, an operation section for computing an equalization error based on output from this ideal signal generation section and output from the equalization section, and a coefficient control section for generating an equalization coefficient supplied to the equalization section based on output from this operation section and a reproduction signal input to the equalization section.

An information reproducing method according to the present invention reproduces digital data recorded on an information recording medium, comprising:

an equalization step of equalizing a reproduction signal read from the information recording medium based on an equalization coefficient, a discrimination step of discriminating an equalization signal obtained at this equalization step, an error correction step of correcting an error in discrimination data obtained at this discrimination step, a modulation step of creating a plurality of modulation data candidates for data obtained at this error correction step and, out of this plurality of modulation data candidates, outputting modulation data having practically a higher correlation with discrimination data obtained at the discrimination step, an ideal signal generation step of generating an ideal signal when modulation data obtained at this modulation step is ideally equalized, an operation step of computing an equalization error based on an ideal signal obtained at this ideal signal generation step and an equalization signal obtained at the equalization step, and a coefficient control step of generating an equalization coefficient supplied to the equalization step based on an equalization error obtained at this operation step and a reproduction signal before equalization at the equalization step.

An information recording medium according to the present invention records training data on a plurality of discontinuous locations in the above-mentioned information recording and reproducing apparatus and the information recording and reproducing method.

According to the above-mentioned configuration and method, it is possible to solve the problems due to conventional training data and perform full circuit adjustment and accurate recording medium evaluation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram outlining a DVD system capable of recording and reproduction;

FIG. 12 is a block diagram detailing a blind equalizer in the DVD system;

FIG. 13 is a block diagram describing a recording signal processing system in the DVD recording and reproducing system;

FIG. 15 is a block diagram detailing a modulator in the DVD recording and reproducing system;

FIG. 20 is a block diagram showing a reproduction signal processing system in the DVD recording and reproducing system;

FIG. 21 is a block diagram detailing a polarity tester in the DVD recording and reproducing system;

FIG. 22 is a block diagram showing another example of the reproduction signal processing system in the DVD recording and reproducing system.

DETAILED DESCRIPTION OF THE INVENTION

An embodiment of the present invention will be described in further detail with reference to the accompanying drawings. FIG. 1 outlines a DVD system configuration. With respect to recording signal processing operations, a data sector builder 3 constitutes a data sector in units of 2,048 bytes for user data.

Figure 2:
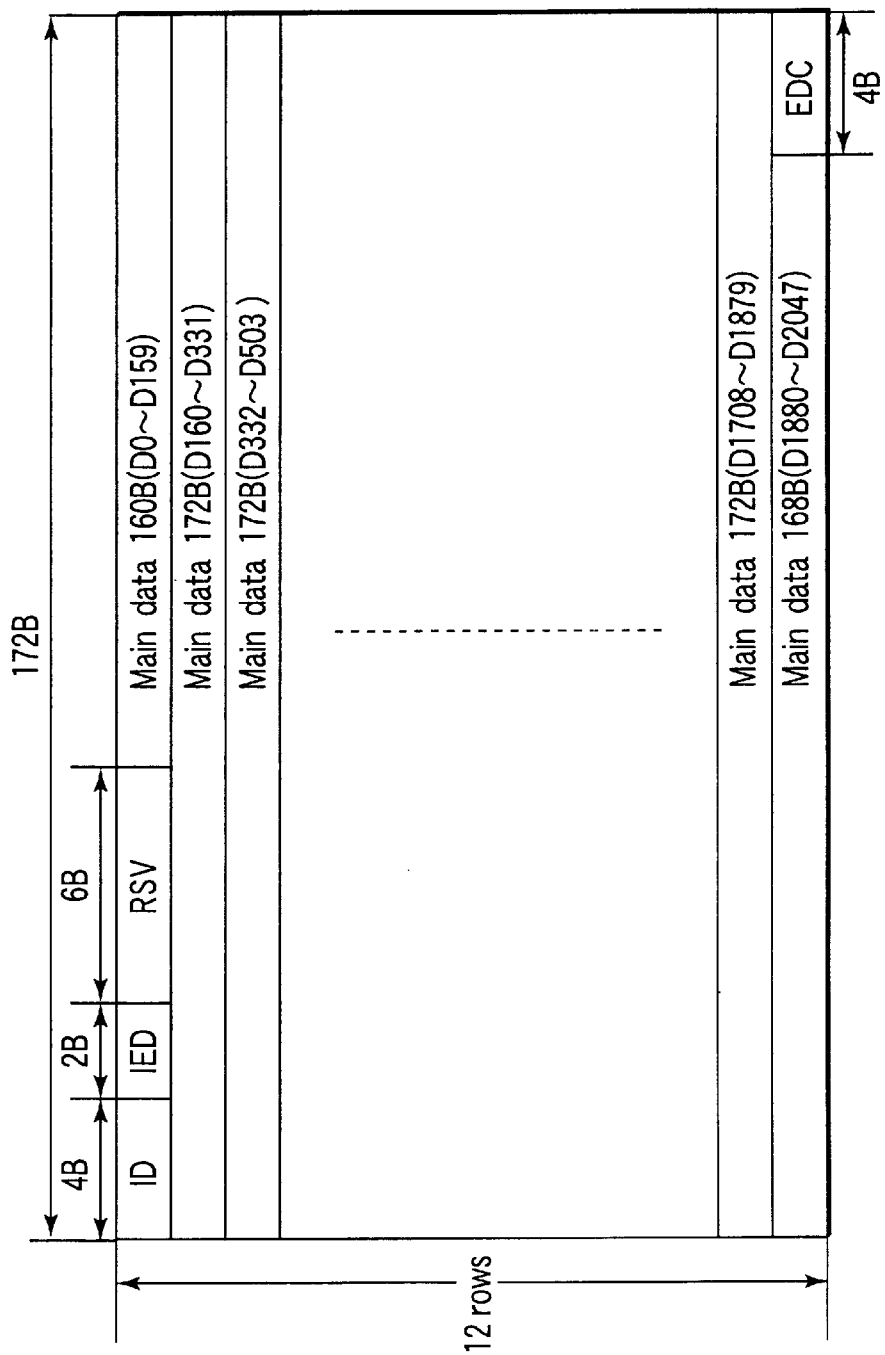
FIG. 2 diagrams a data sector configuration in the DVD system.

FIG. 2 shows a data sector configuration. ID stores information containing a recording address output from an address counter (not shown). IED is an ID error detection parity. RSV is system-reserved data. The end of the data sector is provided with an error detection parity EDC for the entire data sector. After EDC is appended, user data is scrambled by adding PN series data.

Figure 3:
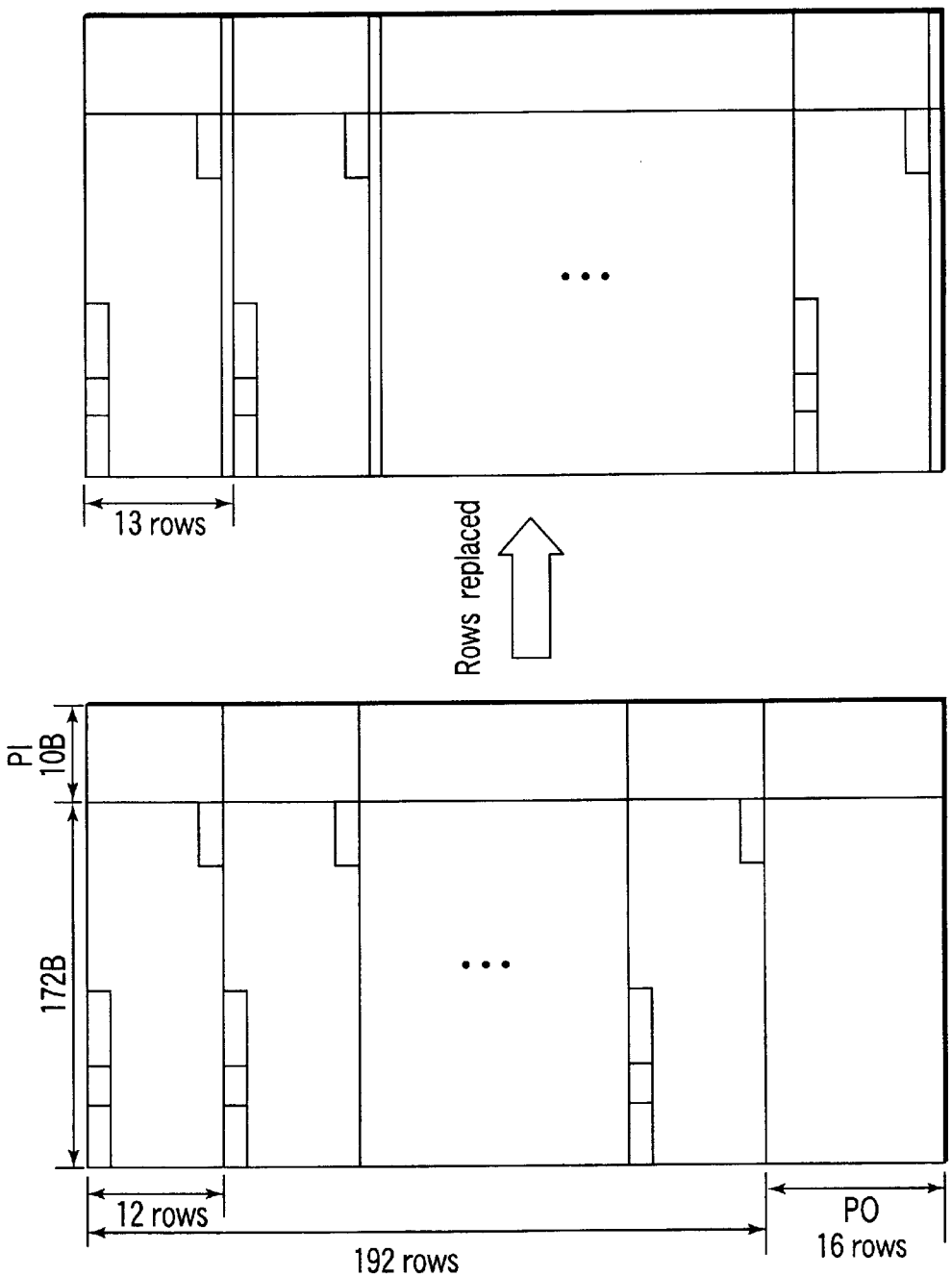
FIGS. 3A and 3B show ECC encoding in the DVD system.

After the scramble, an ECC (Error Correct Code) encoder 6 performs ECC processing in units of 16 data sectors. As shown in FIG. 3A, a 16-row PO parity and 10-row PI parity are generated and appended to an array of consecutive 16 data sectors (172 bytes by 192 rows) for creating a Read-Solomon code comprising 182 bytes by 208 rows.

Figure 4:
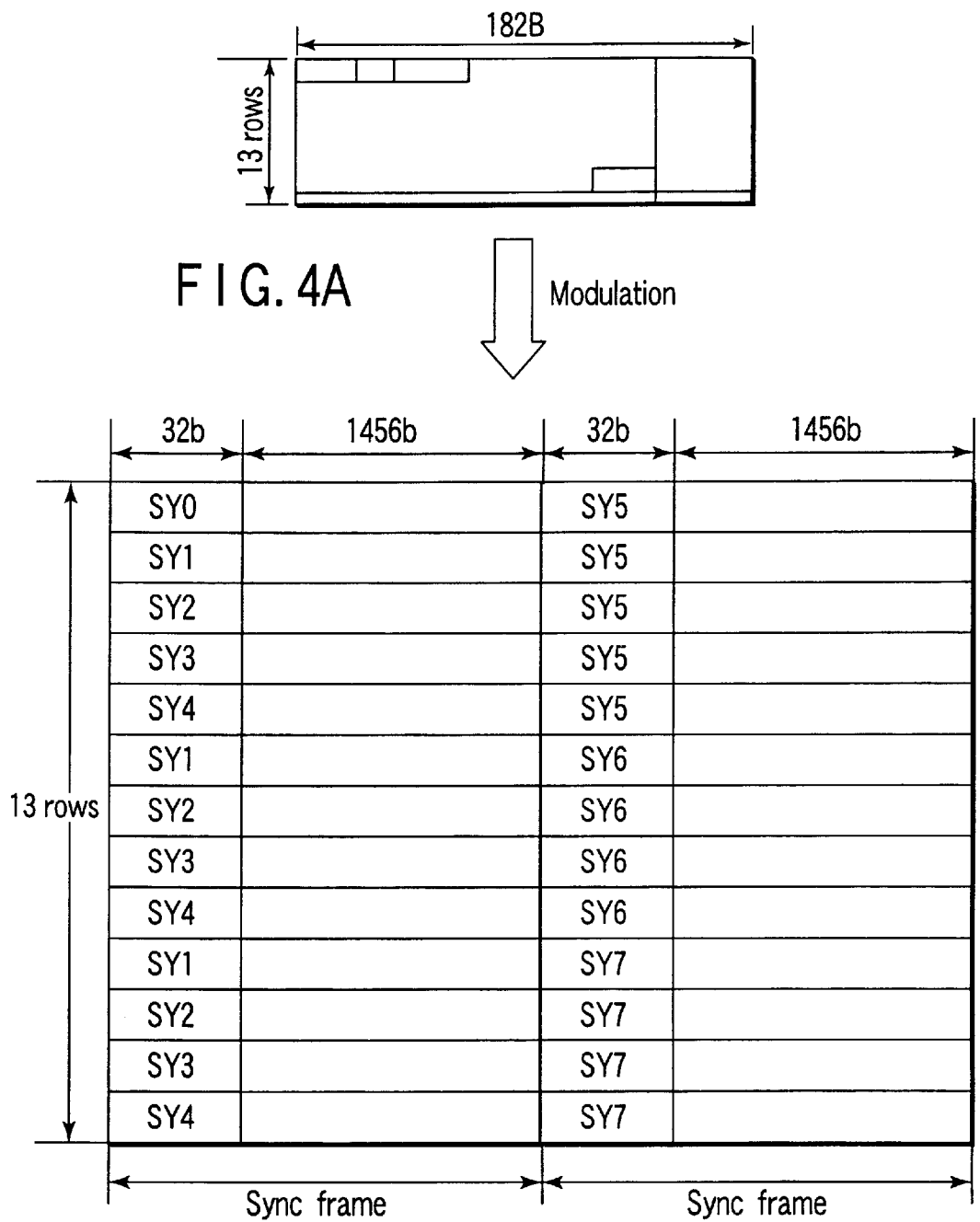
FIGS. 4A and 4B show modulation in the DVD system.

As shown in FIG. 3B, the 16-row PO parity is moved one row at a time to the last row of each sector to create a recording sector comprising 182 bytes by 13 rows. In this recording sector, as shown in FIGS. 4A and 4B, a modulator 7 prefixes a synchronization code every 92 bytes. The recording sector is then 8/16-modulated and is recorded as a physical sector.

Figure 5:
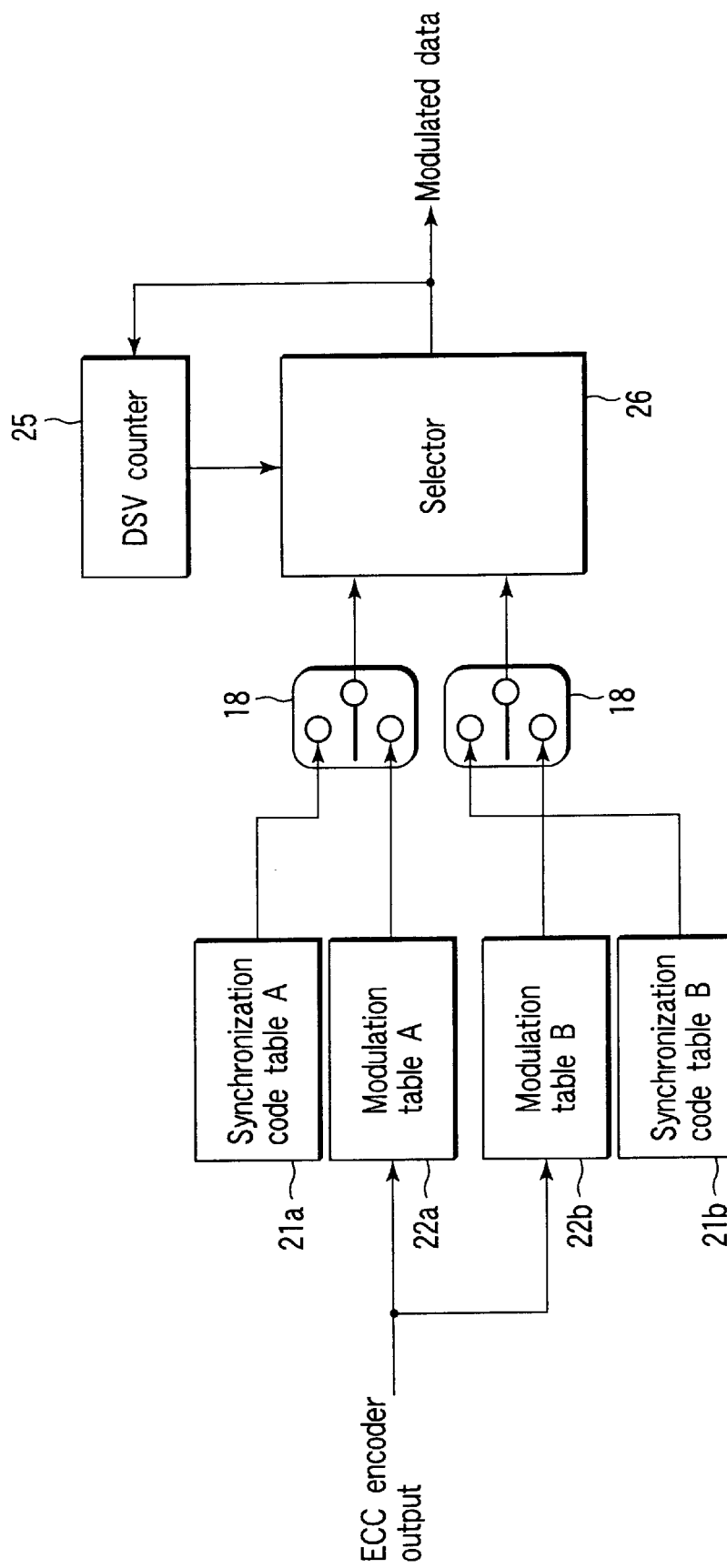
FIG. 5 is a block diagram detailing a modulator in the DVD system.

FIG. 5 shows the configuration of the modulator 7. Data before modulation is modulated by using a modulation table A22a and a modulation table B22b. A synchronization code table A21a and a synchronization code table B21b output synchronization codes corresponding to positions on the physical sector.

Two switches 18 are initially connected to the synchronization code table A21a and the synchronization code table B21b. When the fist synchronization code is output, the switches are then connected to the modulation table A22a and the modulation table B22b. Thereafter, the switch connection is switched between the synchronization code table side and the modulation table side each time 1,456 bits of modulation data are output.

A selector 26 computes which output from the two switches 18 further decreases an absolute value for the DSV (Digital Sum Value). The selector selects an output which provides a smaller absolute value for the DSV. The DSV is an accumulated value generated by incrementing modulation data bit "1" by +1 and decrementing modulation data bit "0" by −1 after the NRZI (Non Return to Zero Inverted) conversion.

Figure 6:
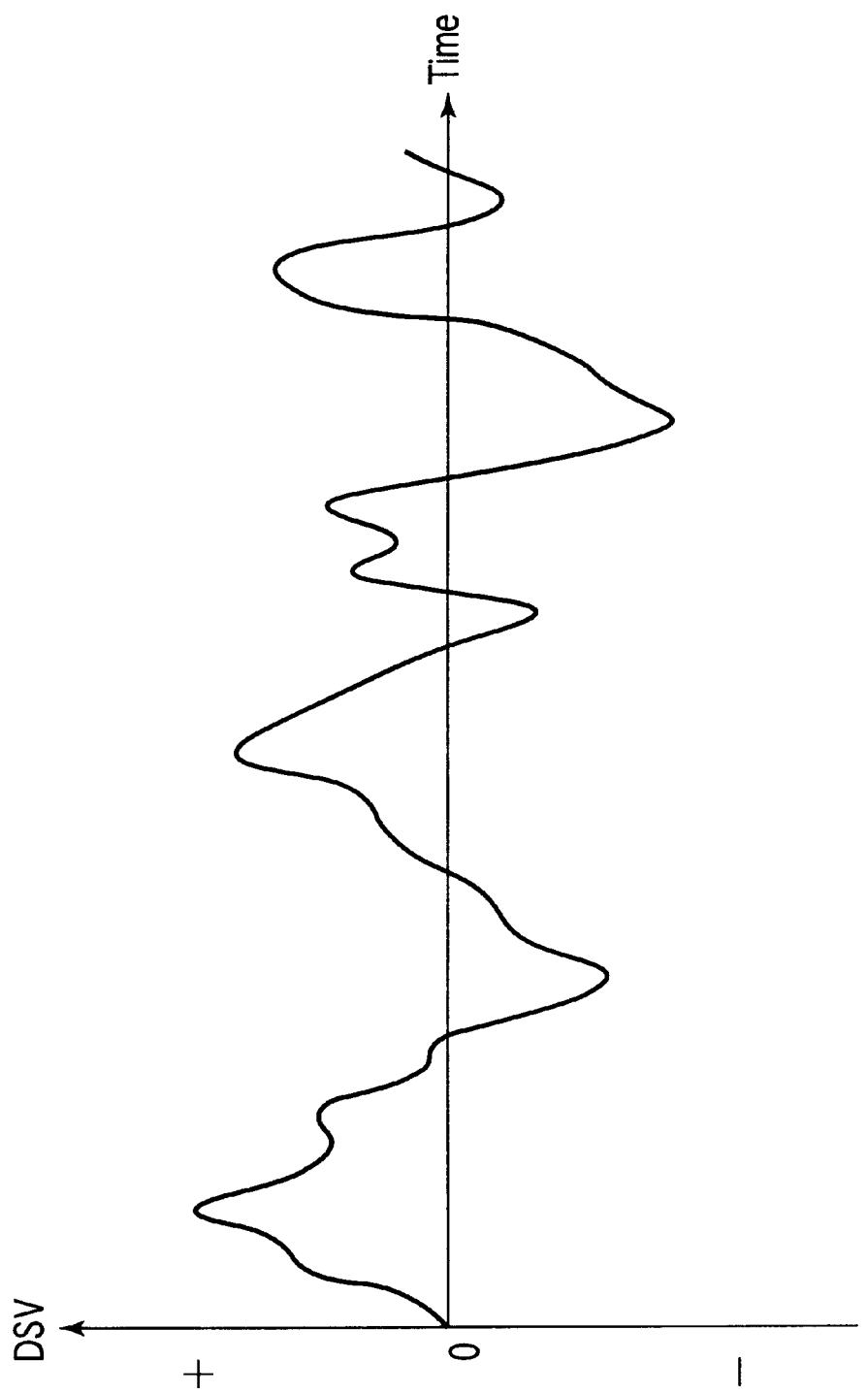
FIG. 6 shows DSV changes in the DVD system.

A DSV counter 25 detects the DSV in output from the selector 26 and outputs the result to the selector 26. Under such control, the DSV converges on the vicinity of 0 as shown in FIG. 6. The modulated data is NRZI-converted, and then is recorded on an optical disk 1 via an optical pickup head 2.

The following describes reproduction signal operations. The waveform slice method is generally used as a reproduction signal processing method. This waveform slice method is described below with reference to waveform diagrams in FIGS. 7A to 7G. On the optical disk 1, there is formed a series of pits in FIG. 7C based on a recording waveform in FIG. 7B corresponding to recording data in FIG. 7A which is information to be recorded.

When reproducing information recorded on the optical disk 1, a reproduction light beam is irradiated onto the optical disk 1 from a laser diode (not shown) in the optical pickup head 2. This reproduction light beam is formed as a fine beam spot as indicated with a shaded circle in FIG. 7C. When the reproduction light beam is thus irradiated, a pit series is read to generate a reproduction signal.

Figure 7:
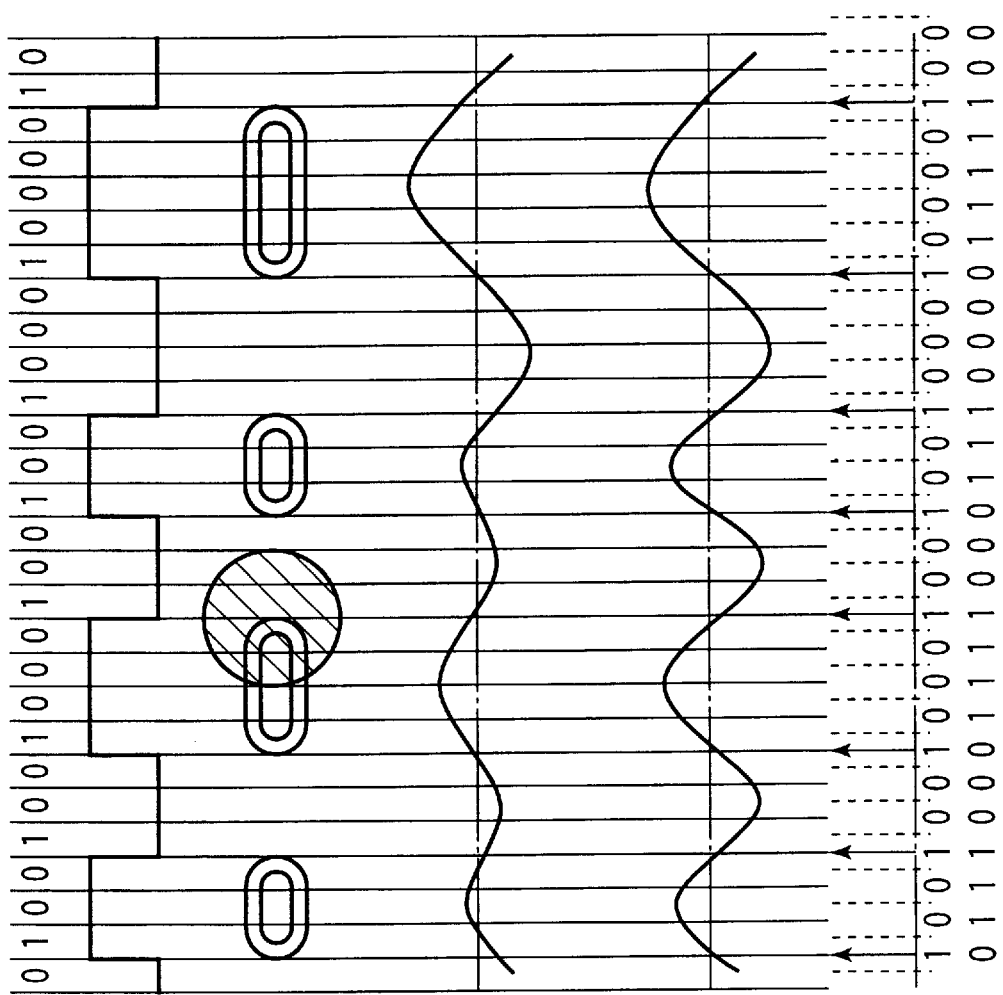
FIGS. 7A to 7G show waveform slice operations in the DVD system.

In this case, a reproduction signal waveform (reproduction waveform) does not become a rectangular wave as shown in FIG. 7B, but becomes a curved waveform as shown in FIG. 7D due to recording and reproducing characteristics.

As shown in FIG. 7E, an equalizer 8 equalizes the reproduction waveform so that an intersection between the equalized waveform and a specified threshold value (indicated with a do-and-dash line) is centered in a window. Specifically, the equalizer amplifies high-frequency component in the reproduction signal.

As shown in FIG. 7F, a discriminator 9 detects an intersection between the equalized waveform and the threshold value. When an intersection is detected in the window, binary data set to "1" is output. When no intersection is detected, binary data reset to "0" is output. A demodulator 10 applies NRZI conversion to the binary data obtained after this intersection detection. Consequently, decoded data as shown in FIG. 7G is obtained and is output via an ECC decoder 11.

As mentioned above, the PRML method is used as a reproduction signal processing method instead of the waveform slice method when a reproduction signal's SNR decreases. In the PRML method, the equalizer 8 equalizes the reproduction waveform to a waveform having a PR characteristic, namely known relationship between identification points.

The following describes various PR characteristics with reference to FIGS. 8A to 8G. FIGS. 8A to 8D are equivalent to FIGS. 7A to 7D, representing recording data, recording waveform, pit series, and reproduction waveform, respectively.

Figure 8:
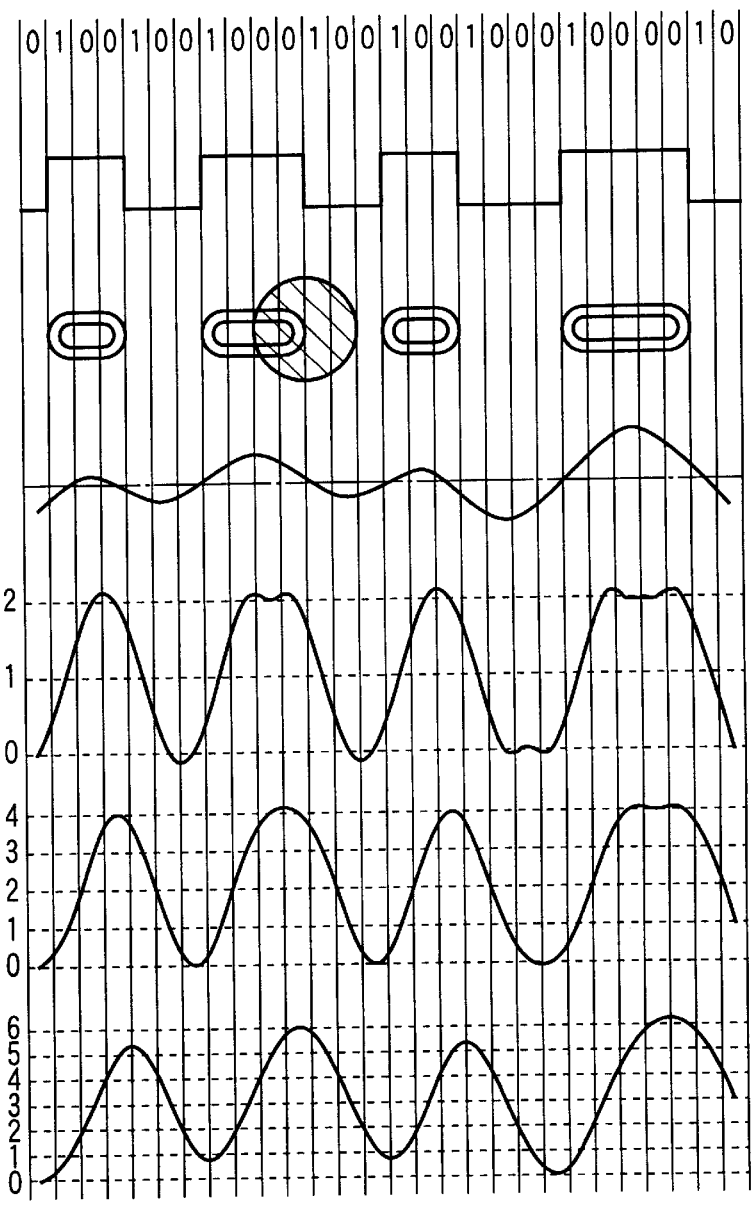
FIGS. 8A to 8G show PRML operations in the DVD system.

The equalizer 8 applies waveform equalization to the reproduction waveform in FIG. 8D based on a PR (1,1) characteristic, a PR (1,2,1) characteristic, and a PR (1,2,2,1) characteristic. FIGS. 8E, 8F, and 8G show respective waveforms after this equalization.

The PR (1,1) characteristic means that an impulse response appears on two consecutive identification points at a ratio of 1:1. The PR (1,2,1) characteristic means that an impulse response appears on three consecutive identification points at a ratio of 1:2:1. The PR (1,2,2,1) characteristic means that an impulse response appears on four consecutive identification points at a ratio of 1:2:2:1. Though not shown here, the other characteristics have the same meanings.

As shown in FIGS. 8E to 8G, the equalized waveform is more remarkably curved in the order of the PR (1,1) characteristic, the PR (1,2,1) characteristic, and the PR (1,2,2,1) characteristic. The PRML method equalizes a waveform to the PR characteristic approximate to the reproduction waveform characteristic, suppressing signal deteriorating components from increasing in the equalizer 8.

The discriminator 9 is arranged after the equalizer 8 in the reproduction signal processing system according to the PRML method. Generally, a Viterbi decoder, one of typical decoders, is used as the discriminator 9. Here, it is assumed that the equalizer 8 equalizes a reproduction waveform to the PR (1,2,2,1) characteristic. The Viterbi decoder selects a series having a smallest error with respect to a sample series in the equalized waveform out of all series satisfying the PR (1,2,2,1) characteristic. The Viterbi decoder then outputs binary data (decoded data) for the selected series.

Figure 9:
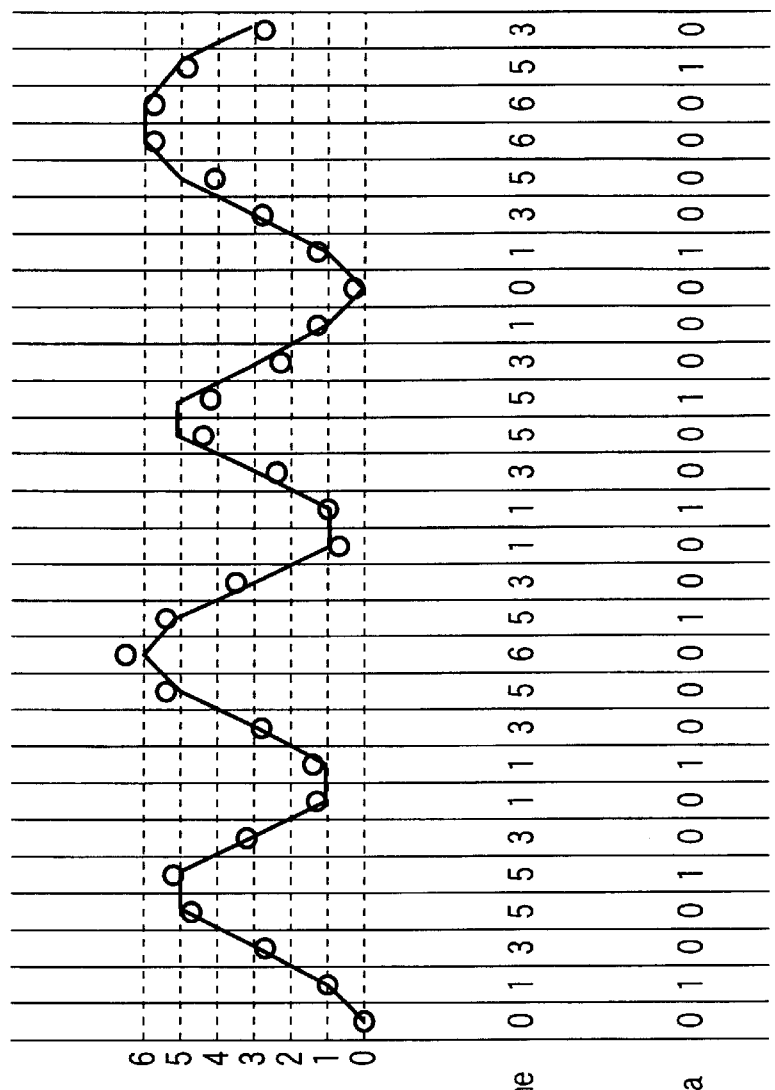
FIGS. 9A to 9C show Viterbi decoder operations in the DVD system.

FIGS. 9A to 9c diagram this decode processing. The PRML method performs decode processing by using a plurality of sample values, not a single sample value. Because of this, the PRML method is characterized by increased resistance to signal deteriorating components having no correlation between sample values.

Figure 10:
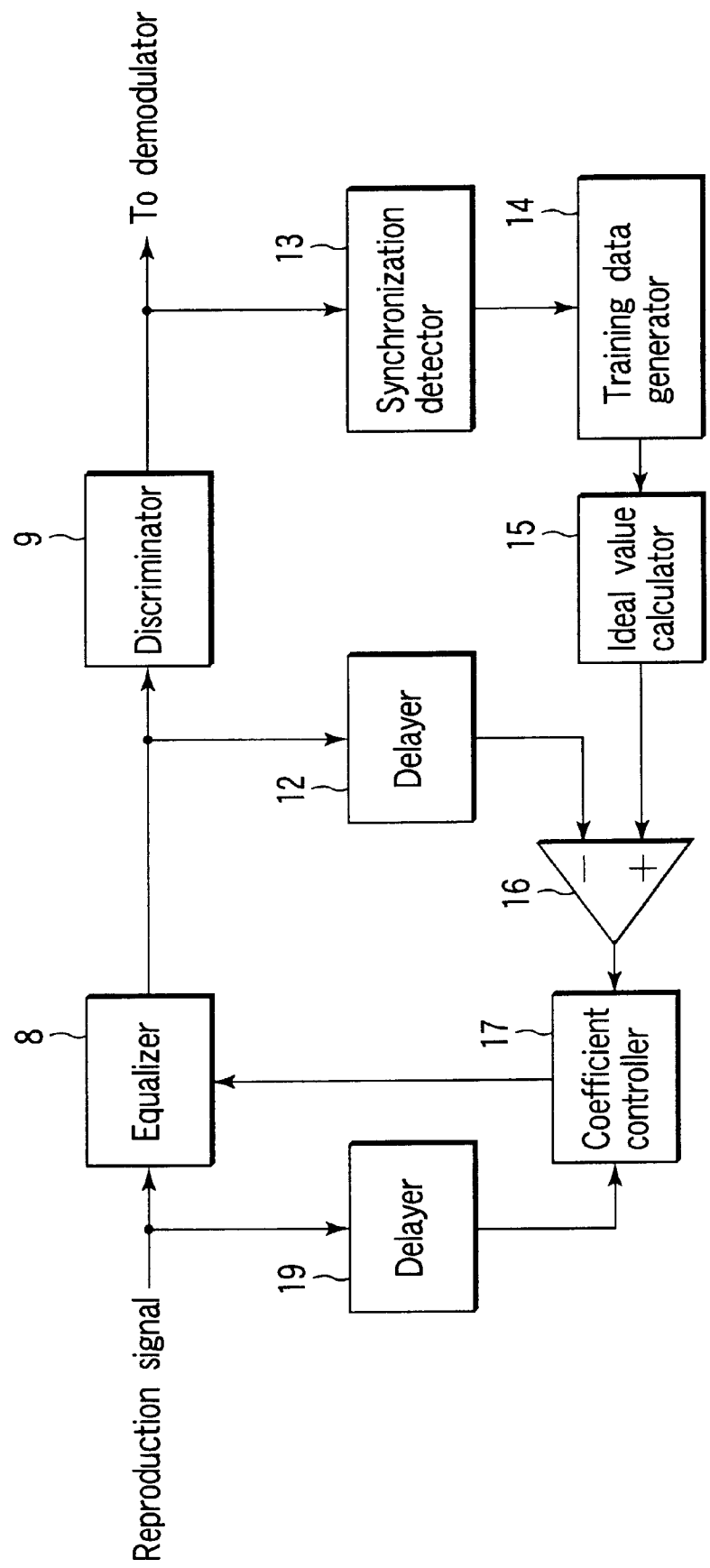
FIG. 10 is a block diagram detailing a preset equalizer in the DVD system.

The PRML method is a reproduction signal processing method for performing discrimination according to oscillation levels. In such a method, it is proposed to use an equalization error for recording medium evaluation or the circuit adjustment reference. For example, a preset equalizer as shown in FIG. 10 adjusts circuits by using known training data recorded on a recording medium.

When reproducing ordinary data, a reproduction signal is input to the equalizer 8. The equalizer 8 equalizes the reproduction signal according to an equalization coefficient registered in the equalizer itself. The equalized signal is input to the discriminator 9. Its discrimination result is output to a subsequent demodulator 10 (not shown).

When reproducing training data, a synchronization detector 13 creates a synchronization signal based on the discrimination result. According to this synchronization signal, a training data generator 14 generates binary training data. An ideal value calculator 15 uses the binary training data as input and creates a signal (hereafter referred to as the ideal signal) when the training data is equalized ideally.

A subtractor 16 finds an equalization difference, namely a difference between the equalization signal timing-adjusted by a delayer 12 and the ideal signal. A coefficient controller 17 updates the equalization coefficient according to, say, the MSE (Minimum Square Error) method by using the reproduction signal timing-adjusted by the delayer 19 and the equalization error.

Figure 11:
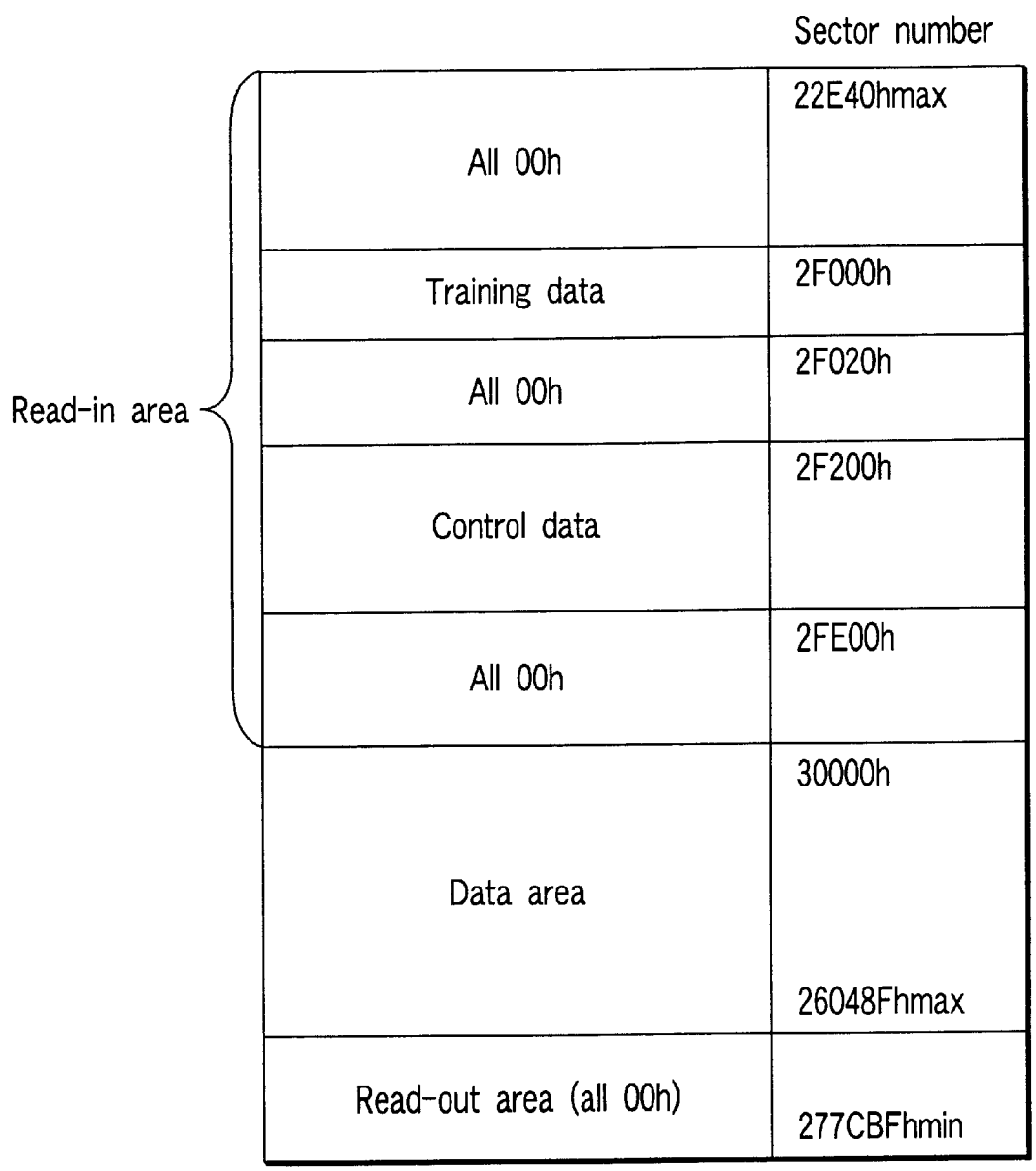
FIG. 11 is a block diagram showing a recording area for training data in the DVD system.

As shown in FIG. 11, the present DVD system records training data in a read-in area on the optical disk 1 as a recording medium. The training data comprises a repetitive pattern of 3T-6T-7T on the recording medium.

A blind equalizer in FIG. 12 adjusts circuits while ordinary data is reproduced. When ordinary data is reproduced, its reproduction signal is input to the equalizer 8. The equalizer 8 equalizes the reproduction signal according to an equalization coefficient registered in the equalizer itself.

This equalized signal is input to the discriminator 9. Its discrimination result is output to a subsequent demodulator 10 (not shown). The discrimination result is also input to the ideal value calculator 15 for computing the ideal signal on the assumption that the discrimination result is correct.

A subtractor 16 finds an equalization difference, namely a difference between the equalization signal timing-adjusted by a delayer 12 and the ideal signal. A coefficient controller 17 updates the equalization coefficient by using the reproduction signal timing-adjusted by the delayer 19 and the equalization error.

When the method uses the repetitive pattern for training data as mentioned above, the training data and the ordinary data use different pit lengths and space occurrence frequencies. Accordingly, it is difficult to fully adjust circuit and correctly evaluate recording media.

To use the same pit length and space occurrence frequency for the training data and the ordinary data, the same procedure as for creating ordinary data is used to create a data sector, an ECC block, and a physical sector from random data. If the thus created physical sector is used as training data, there is a high possibility of causing unexpected training data due to the DSV control.

Furthermore, the same procedure as for creating ordinary data is used to create a data sector, an ECC block, and a physical sector from random data. If the thus created physical sector is used as training data, the training data pit is inverted to a space, or vice versa, causing unexpected training data.

Some information recording and reproducing system computes an equalization error from a recording and reproducing signal of the ordinary data and the ideal equalization signal found from the discriminator output data. Using this equalization error, the system evaluates recording media or adjusts circuits. In such an information recording and reproducing system, propagation of a discrimination error prevents correct control of the recording medium evaluation or the circuit adjustment.

FIG. 13 shows the configuration of the recording signal processing system in the DVD recording and reproducing system. An address comparator 4 contains a table which records addresses for recording the training data. The address comparator 4 outputs an H (High) signal when the table contains an input recording address or outputs an L (Low) signal otherwise.

A switch 5 operates to introduce the training data when the address comparator 4 outputs an H signal. It operates to introduce the user data when the address comparator 4 outputs an L signal. The training data is fixed to 2,048 bytes and is capable of random data.

The data sector builder 3 builds a data sector in units of 2,048 bytes. The data sector configuration is same as that in FIG. 2 as described above. When the switch 5 is set to introduce the training data, the training data is arranged instead of the user data.

Namely, ID stores information containing a recording address. IED is an ID error detection parity. RSV is system-reserved data. The end of the data sector is provided with an error detection parity EDC for the entire data sector.

Figures 14A, 14B:
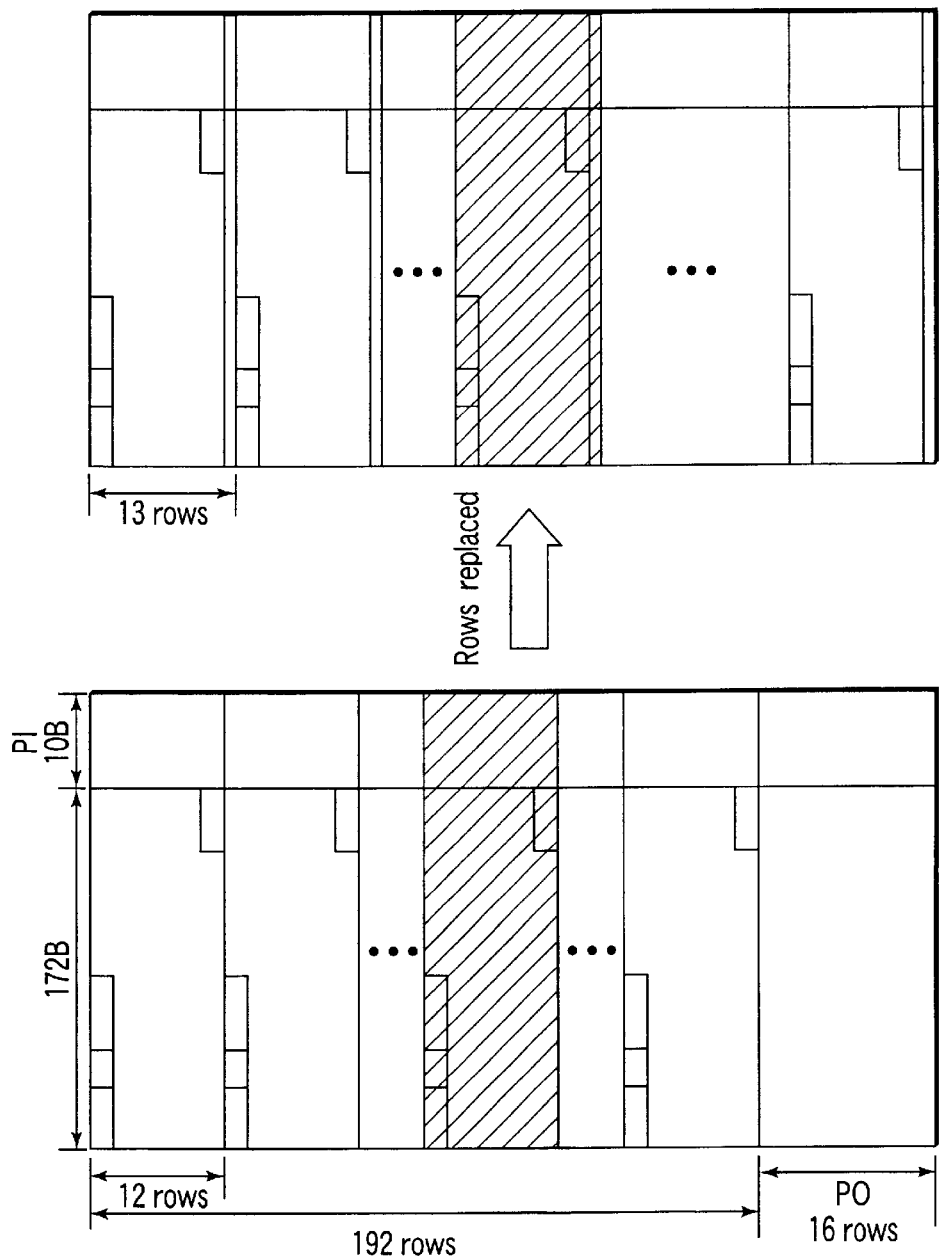
FIGS. 14A and 14B describe an ECC block containing training data in the DVD recording and reproducing system.

Thereafter, the ECC encoder 6 performs ECC processing in units of 16 data sectors. As shown in FIG. 14A, a 16-row PO parity and 10-row PI parity are generated and appended to an array of consecutive 16 data sectors (172 bytes by 192 rows) for creating a Read-Solomon code comprising 182 bytes by 208 rows. As shown in FIG. 14B, the 16-row PO parity is moved one row at a time to the last row of each sector to create a recording sector comprising 182 bytes by 13 rows.

In FIGS. 14A and 14B, a shaded portion is a recording sector which stores the training data. Namely, these figures show that there is provided an ECC block comprising the training data and the ordinary data.

FIG. 15 shows the configuration of the modulator 7. When the address comparator 4 outputs an L signal, the modulator 7 performs the same operation as for the modulator in FIG. 5. When the address comparator 4 outputs an H signal, the DSV counter 25 saves the DSV (C1) at that time in memory 27 and resets the DSV to 0.

While output from the address comparator 4 remains the H signal, the DSV counter 25 does not compute the DSV. Namely, while output from the address comparator 4 remains the H signal, the DSV counter 25 outputs DSV "0" to the selector 26.

Figure 16:
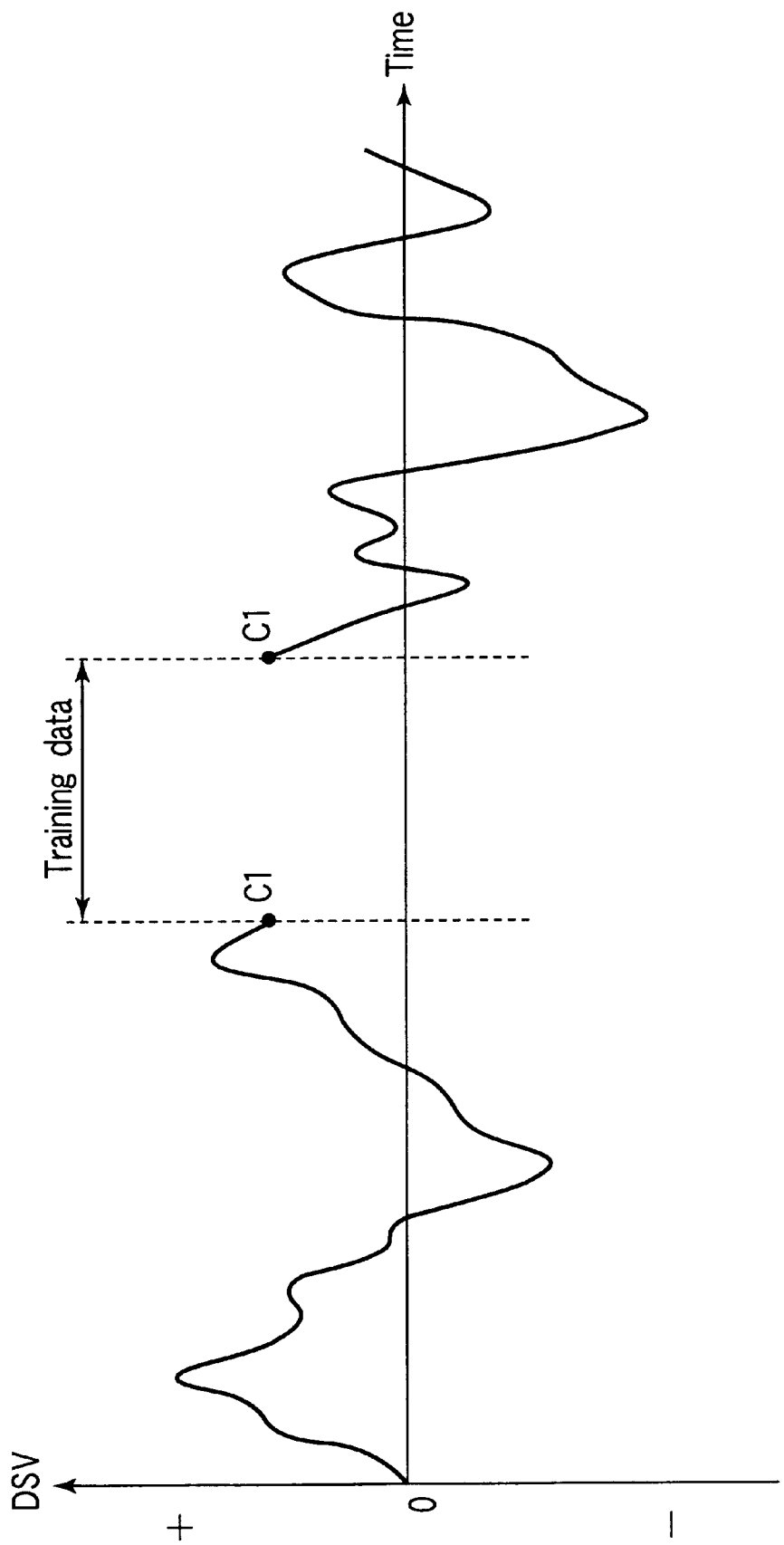
FIG. 16 shows an example of DSV counter operations in the DVD recording and reproducing system.

The moment that output from the address comparator 4 changes to the L signal from the H signal, the DSV (C1) saved in the memory 27 is loaded into the DSV counter 25. Accordingly, the selector 26 is supplied with DSV "0" while the training data is created as shown in FIG. 16.

Because of this, data patterns match at almost all locations in a physical sector for storing the training data independently of DSV for the data preceding the training data.

The occurrence frequency of each run matches between the modulated data pattern for the thus created training data and the modulated data pattern for the ordinary data. Accordingly, the reproduction signal characteristic matches between the training data and the ordinary data, allowing high-precision circuit adjustment or correct recording medium evaluation.

Figure 17:
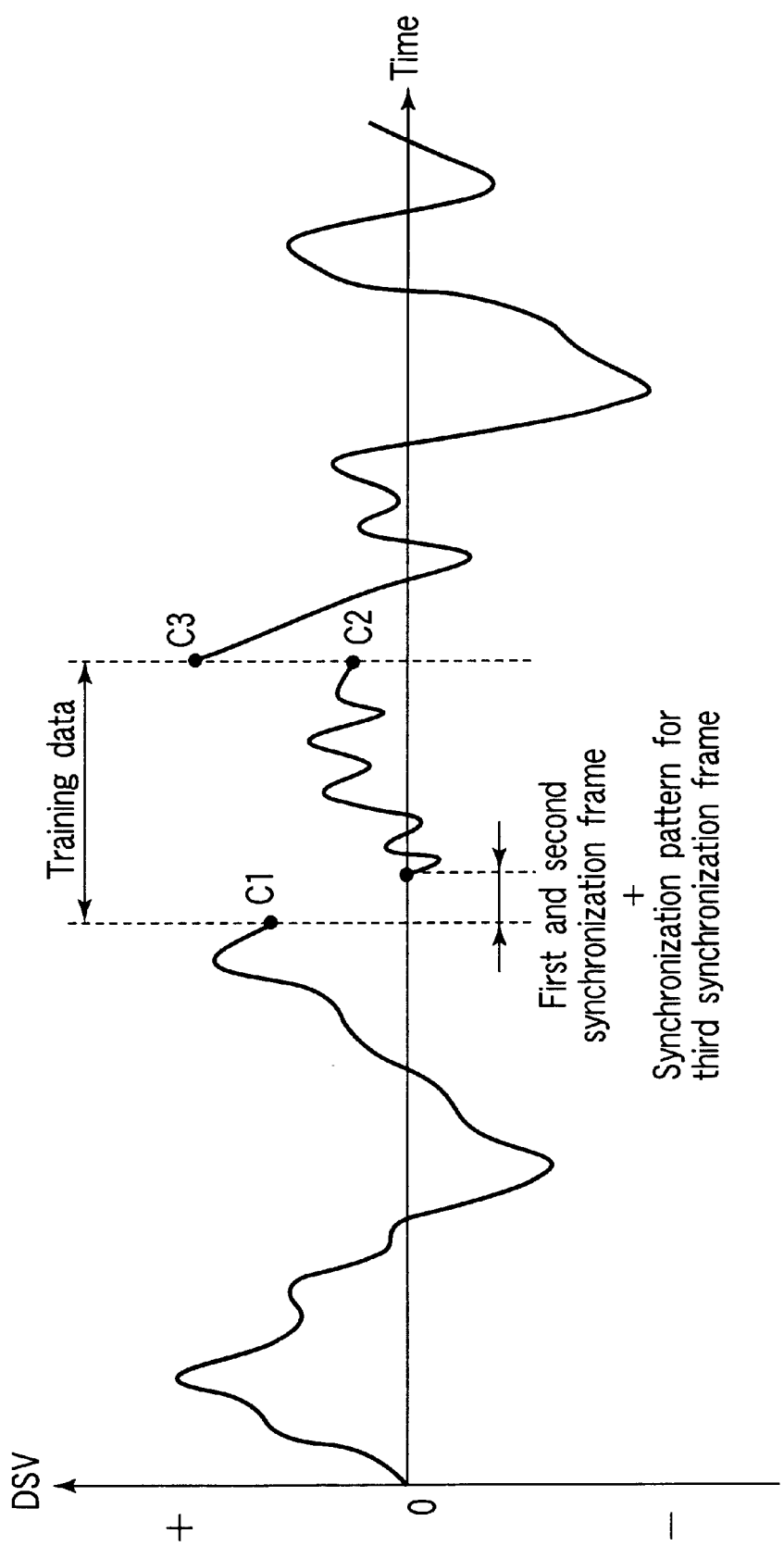
FIG. 17 shows another example of DSV counter operations in the DVD recording and reproducing system.

FIG. 17 shows another example of operations of the modulator 7. When the address comparator 4 outputs an H signal, the DSV counter 25 saves the DSV (C1) in memory 27 and resets the DSV to 0. By maintaining this state, the DSV counter does not compute the DSV until after a synchronization pattern for the third synchronization frame is output.

After the synchronization pattern for the third synchronization frame is output, the DSV counter starts counting the DSV. The moment that output from the address comparator 4 changes to the L signal from the H signal, DSV (C1) saved in the memory 27 is added to DSV (C2) in the DSV counter 25.

As shown in FIG. 17, the selector 26 is supplied with DSV "0" while the training data is created. Further, FIG. 17 shows that adding C1 to C2 results in C3.

Figure 18:
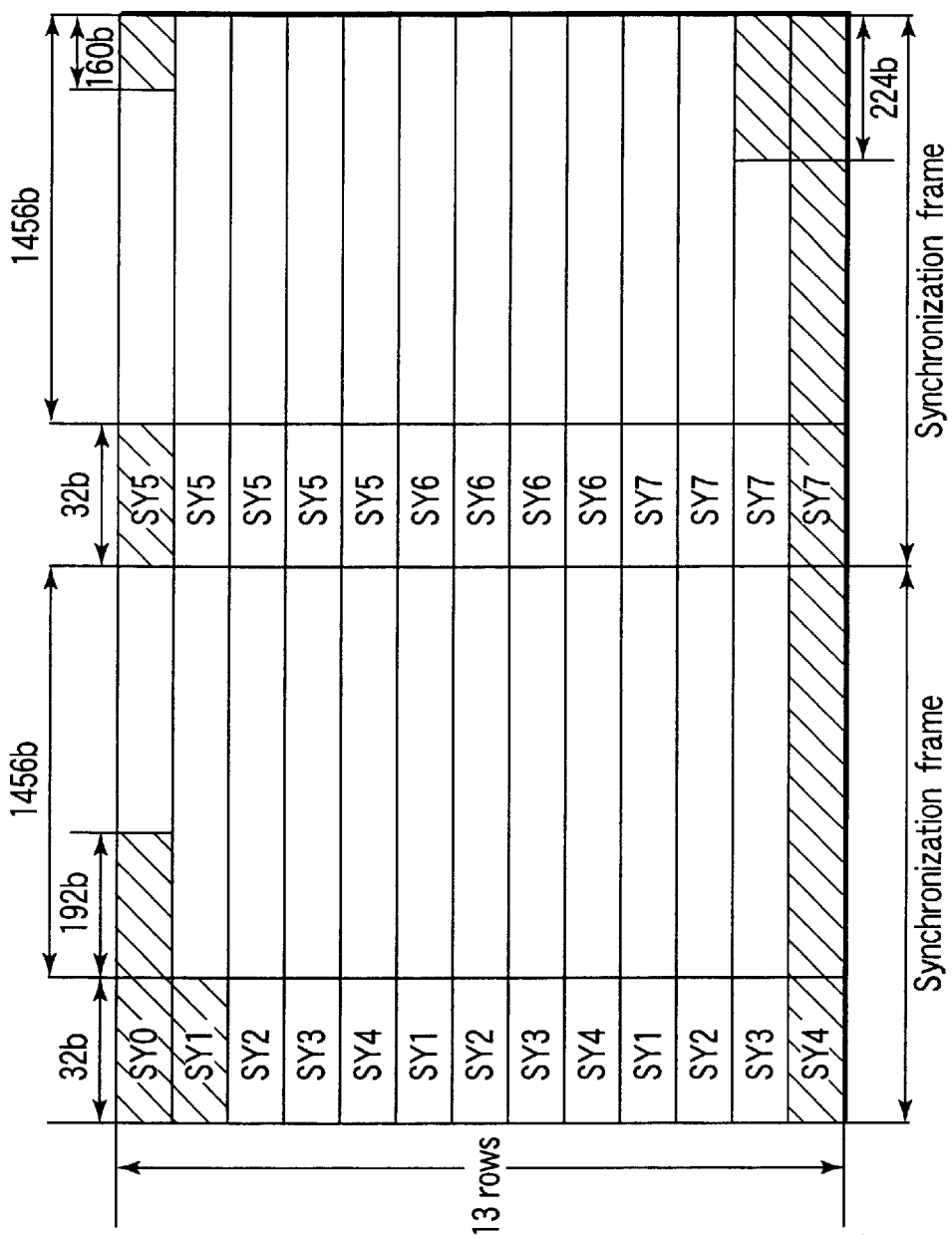
FIG. 18 describes a physical sector storing training data in the DVD recording and reproducing system.

FIG. 18 shows the configuration of a physical data storing the training data. When one type of training data is recorded at a plurality of locations on the recording medium, only shaded areas in FIG. 18 differ. The other data patterns are unchanged. Output data from the modulator 7 is NRZI-converted, and then is recorded on the optical disk 1 via an optical pickup head 2.

As mentioned above, the training data is recorded in the read-in area of the optical disk 1. With the advancement of high-density recording, however, the reproduction signal characteristic changes depending on a radius of the optical disk 1.

Figure 19:
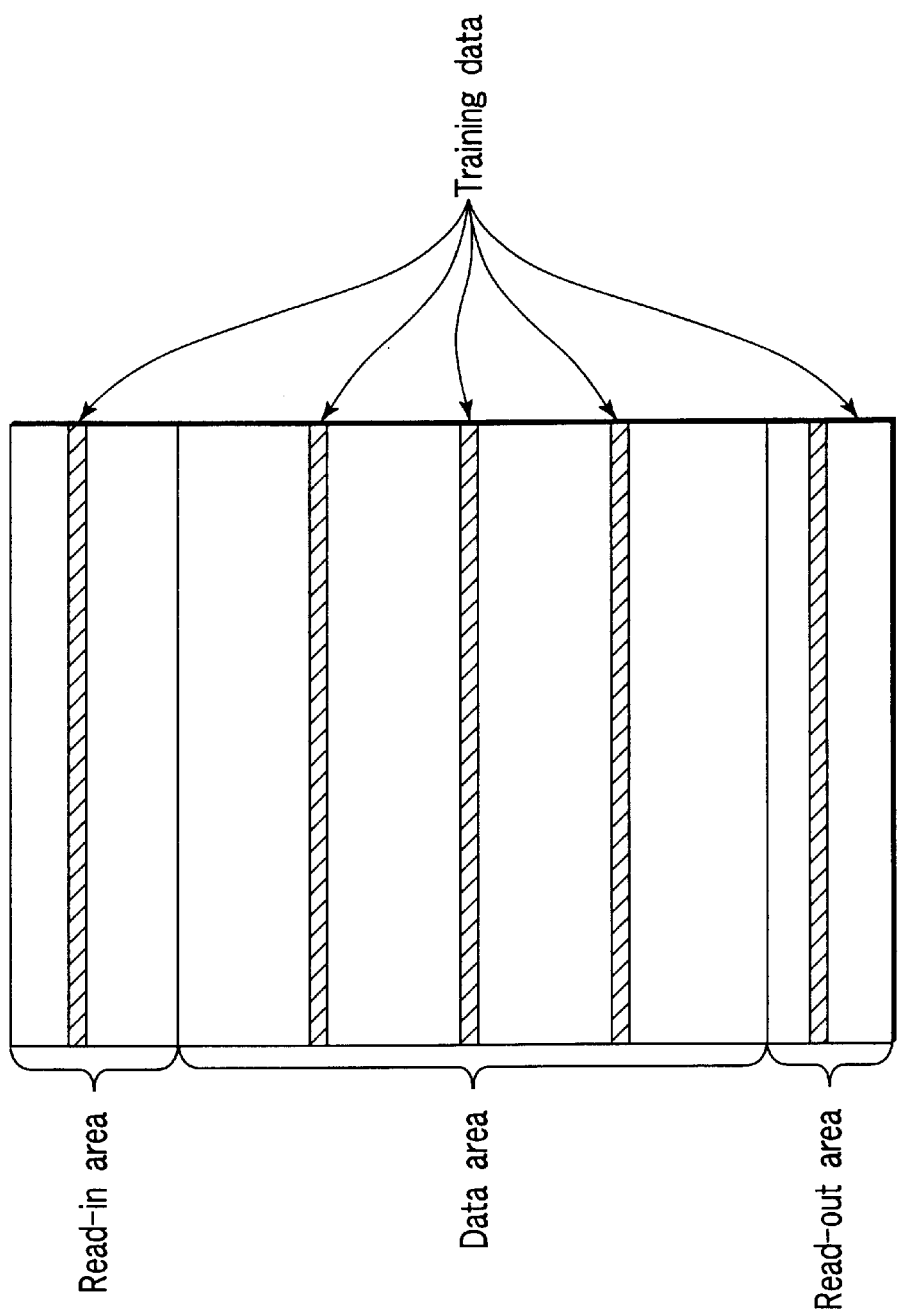
FIG. 19 describes training data arrangement on an optical disk in the DVD recording and reproducing system.

In this case, it is desirable to place the training data not only in the read-in area, but also in the data area and the read-out area as shown in FIG. 19. Further, it is desirable to use the ordinary data to be reproduced and nearby training data for circuit adjustment or recording medium evaluation.

When the training data discrimination pattern is embedded in the training data, it is possible to change the number of training data entries to be recorded or recording locations depending on recording media. It is preferable to record this training data discrimination pattern in the first or second synchronization frame.

FIG. 20 shows the configuration of the reproduction signal processing system in the above-mentioned DVD recording and reproducing system. Basically, the reproduction signal processing system in FIG. 20 performs operations similar to the preset equalizer as shown in FIG. 10.

The training data generator 14 stores the training data ranging from the synchronization code in the third synchronization frame of the physical sector as shown in FIG. 18 to the 24th synchronization frame minus 225 bits from the end thereof. This training data is saved in the NRZ (Non Return to Zero) format. The training data is output from the training data generator 14 corresponding to the synchronization detection timing.

A polarity tester 28 contains the training data and a discrimination result which is timing-adjusted by a delayer 20. FIG. 21 shows the configuration of the polarity tester 28. The polarity tester 28 uses an NRZI converter 29 to apply NRZI conversion to the training data.

At this time, there are created two types of data (regular data and reverse data) with opposite polarities. Correlators 30a and 30b compute correlation between these types of data and timing-adjusted discrimination data.

Specifically, the correlation is computed as follows. Namely, the following two series are input to the correlators 30a and 30b.

A=(A0, A1, ... , Am)
B=(B0, B1, ... , Bm) where Ai or Bi is 0 or 1.

According to A and B, the correlation is computed as follows.

$$Corr = \sum_{i=0}^{m} !(Ai \oplus Bi)$$

!: NOT operation $\oplus$: XOR operation

The more matching bits the two series A and B contain, the greater value the correlation provides. The comparator 24 compares outputs from the correlators 30a and 30b. The switch 23 is controlled so as to select and output NRZI data which increases the correlation.

Though FIG. 21 uses two correlators 30a and 30b, other configurations may be preferable. For example, a correlation between the regular data (or reverse data) and the discrimination data is computed. When the correlation is greater than or equal to m/2 (where m is a data length for finding the correlation), the regular data (or reverse data) is output. When the correlation is smaller than m/2, the reverse data (or regular data) is output.

Thereafter, the ideal value calculator 15 computes an ideal signal according to output from the polarity tester 28. The subtractor 16 finds an equalization error according to this ideal signal and an equalization signal from the equalizer 8. The coefficient controller 17 finds an equalization coefficient according to this equalization error and a reproduction signal, thus updating the equalization coefficient for the equalizer 8.

In the above-mentioned reproduction signal processing system, the training data generator 14 stores the training data ranging from the synchronization code in the third synchronization frame of the physical sector to the 24th synchronization frame minus 225 bits from the end thereof. However, the training data generator 14 may be capable of outputting part of the training data ranging from the synchronization code in the third synchronization frame of the physical sector to the24th synchronization frame minus 225 bits from the end thereof.

FIG. 22 shows another example of the above-mentioned reproduction signal processing system. This example uses the PRML method for reproduction signal processing. Control of an equalization coefficient follows the blind equalization algorithm.

The equalizer 8 converts a reproduction signal from the optical disk 1 to an equalization signal which satisfies a specified PR characteristic. The discriminator 9 follows the Viterbi algorithm for discrimination. Discrimination data is extracted as decoded data via the demodulator 10 and the ECC decoder 11.

Figure 23:
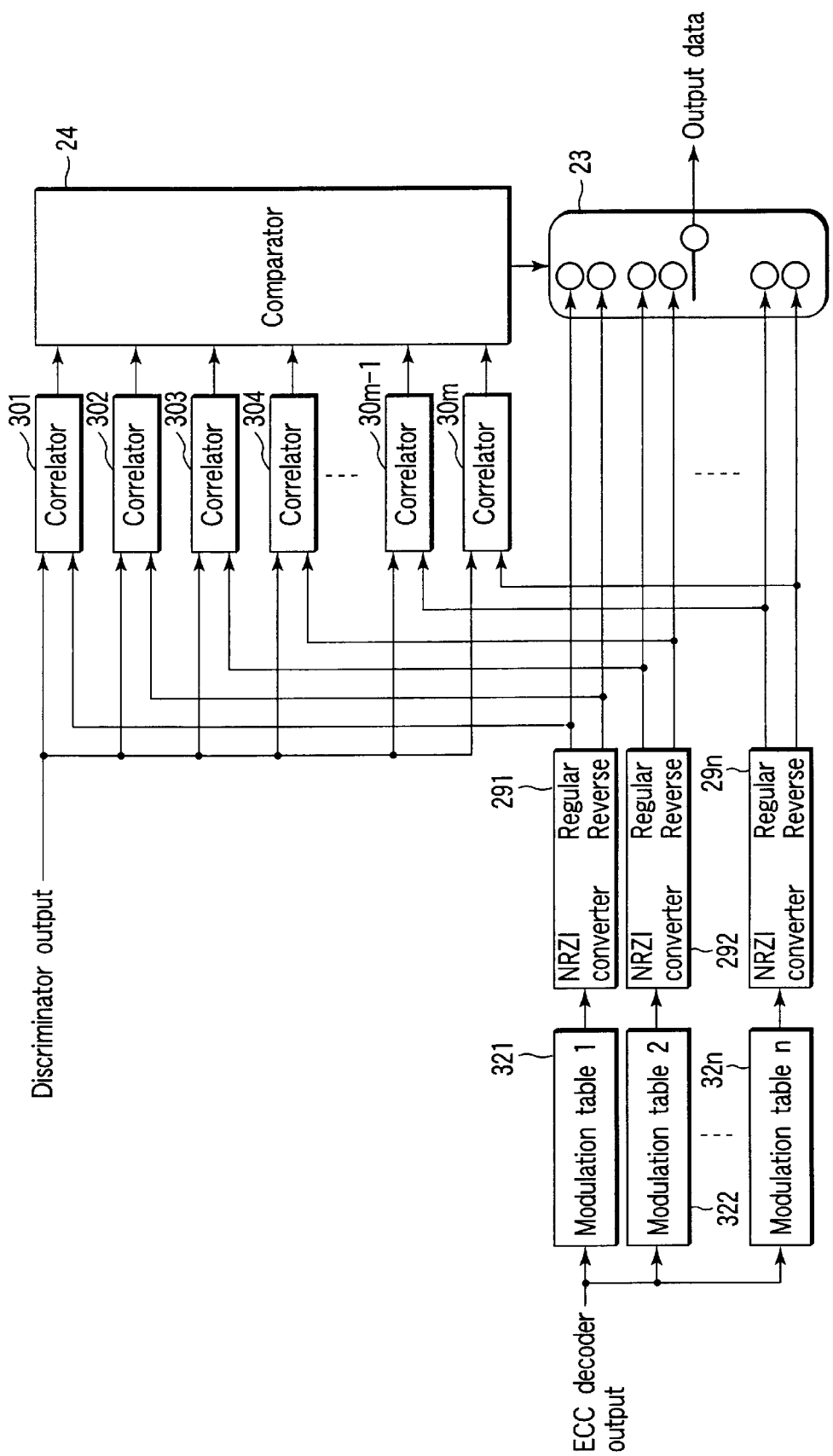
FIG. 23 is a block diagram detailing a second modulator in another example of the reproduction signal processing system.

A second modulator 31 is configured as shown in FIG. 23. This modulator generates n types of modulation data by using all n types of modulation tables 321 to 32n from the ECC output data. These n types of modulation data are NRZI-converted by NRZI converters 291 to 29n, respectively.

Each of NRZI converters 291 to 29n creates two types of data (regular data and reverse data) with opposite polarities. Correlators 301 to 30m ($m=2n$) compute a correlation between these $2n$ data and timing-adjusted discrimination data.

The comparator 24 controls the switch 23 so as to selectively output NRZI data with the highest correlation for regular data out of $2n$ correlation values. Thereafter, the ideal value calculator 15 computes an ideal signal according to thus obtained output from the second modulator 31. The subtractor 16 finds an equalization error according to this ideal signal and an equalization signal from the equalizer 8. The coefficient controller 17 finds an equalization coefficient according to this equalization error and a reproduction signal, thus updating the equalization coefficient for the equalizer 8.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording and reproducing apparatus comprising:

recording means having first selection means for selecting user data and training data based on a recording address, modulation means for creating a plurality of modulation data candidates with respect to data selected by this first selection means, second selection means for selecting various modulation data candidates created by this modulation means, a counter for counting DSVs in modulation data selected by this second selection means, and control means for setting a DSV output from this counter to a specified value with said training data selected by said first selection means, wherein said recording means records modulation data selected by said second selection means on an information recording medium; and reproduction means having equalization means for equalizing a reproduction signal read from said information recording medium based on an equalization coefficient, discrimination means for discriminating output from this equalization means, training data generation means for outputting predetermined training data based on output from this discrimination means, polarity test means for testing a polarity of training data output from this training data generation means based on output discrimination data of said discrimination means, ideal signal generation means for generating an ideal signal when the training data is ideally equalized from output of this polarity test means, operation means for computing an equalization error based on output from this ideal signal generation means and output from said equalization means, and coefficient control means for generating an equalization coefficient supplied to said equalization means based on output from this operation means and a reproduction signal input to said equalization means.

2. The information recording and reproducing apparatus according to claim 1, wherein said polarity test means comprising:

conversion means for converting said input training data to regular polarity data and reverse polarity data, first correlation operation means for computing a correlation between regular polarity data converted by this conversion means and discrimination data output from said discrimination means, second correlation operation means for computing a correlation between reverse polarity data converted by said conversion means and discrimination data output from said discrimination means, and comparison and selection means for comparing operation results from said first and second correlation operation means and selectively outputting regular or reverse polarity data having practically a higher correlation with said discrimination data.

3. An information recording and reproducing apparatus comprising:

a recording section having a first selection section for selecting user data and training data based on a recording address, a modulation section for creating a plurality of modulation data candidates with respect to data selected by this first selection section, a second selection section for selecting various modulation data candidates created by this modulation section, a counter for counting DSVs in modulation data selected by this second selection section, and a control section for setting a DSV output from this counter to a specified value with said training data selected by said first selection section, wherein said recording section records modulation data selected by said second selection section on an information recording medium; and a reproduction section having an equalization section for equalizing a reproduction signal read from said information recording medium based on an equalization coefficient, a discrimination section for discriminating output from this equalization section, a training data generation section for outputting predetermined training data based on output from this discrimination section, a polarity test section for testing a polarity of training data output from this training data generation section based on output discrimination data of said discrimination section, an ideal signal generation section for generating an ideal signal when the training data is ideally equalized from output of this polarity test section, an operation section for computing an equalization error based on output from this ideal signal generation section and output from said equalization section, and a coefficient control section for generating an equalization coefficient supplied to said equalization section based on output from this operation section and a reproduction signal input to said equalization section.

4. The information recording and reproducing apparatus according to claim 3, wherein said polarity test section comprising:

a conversion section for converting said input training data to regular polarity data and reverse polarity data, a first correlation operation section for computing a correlation between regular polarity data converted by this conversion section and discrimination data output from said discrimination section, a second correlation operation section for computing a correlation between reverse polarity data converted by said conversion section and discrimination data output from said discrimination section, and a comparison and selection section for comparing operation results from said first and second correlation operation sections and selectively outputting regular or reverse polarity data having practically a higher correlation with said discrimination data.

5. The information recording medium according to claim 1, wherein said training data is recorded on a plurality of discontinuous locations.

6. An information recording and reproducing method comprising:
 a recording step having a first step of selecting user data and training data based on a recording address, a second step of creating a plurality of modulation data candidates with respect to data selected by this first step, and a third step of counting DSVs in single modulation data selected from various modulation data candidates created at this second step to control selection of said various modulation data candidates and setting said counter for counting DSVs to a specified value with training data selected at said first step, wherein said recording step records modulation data selected at said third step on an information recording medium; and
 a reproduction step having a fourth step of equalizing a reproduction signal read from said information recording medium based on an equalization coefficient, a fifth step of discriminating an equalization signal obtained at this fourth step, a sixth step of outputting predetermined training data based on discrimination data obtained at this fifth step, a seventh step of testing a polarity of training data output from this sixth step based on output discrimination data obtained at said fifth step, an eighth step of generating an ideal signal when the training data is ideally equalized from training data obtained at said seventh step, a ninth step of computing an equalization error based on an ideal signal obtained at this eighth step and an equalization signal obtained at said fourth step, and a tenth step of generating an equalization coefficient supplied to said fourth step based on an equalization error obtained at this ninth step and a reproduction signal before processing at said fourth step.

7. The information recording and reproducing method according to claim 6, wherein said seventh step comprising:
 a conversion step of converting said input training data to regular polarity data and reverse polarity data, a first correlation operation step of computing a correlation between regular polarity data converted by this conversion step and discrimination data obtained at said fifth step, a second correlation operation step of computing a correlation between reverse polarity data converted by said conversion step and discrimination data obtained at said fifth step, and a comparison and selection step of comparing operation results from said first and second correlation operation steps and selectively outputting regular or reverse polarity data having practically a higher correlation with said discrimination data.

8. An information recording medium according to claim 6, wherein said training data is recorded on a plurality of discontinuous locations.

9. An information reproducing apparatus for reproducing digital data recorded on an information recording medium comprising:
 equalization means for equalizing a reproduction signal read from said information recording medium based on an equalization coefficient, discrimination means for discriminating output from this equalization means, error correction means for correcting an error in output from this discrimination means, modulation means for creating a plurality of modulation data candidates for output from this error correction means and, out of this plurality of modulation data candidates, outputting modulation data having practically a higher correlation with discrimination data obtained from said discrimination means, ideal signal generation means for generating an ideal signal when modulation data output from this modulation means is ideally equalized, operation means for computing an equalization error based on output from this ideal signal generation means and output from said equalization means, and coefficient control means for generating an equalization coefficient supplied to said equalization means based on output from this operation means and a reproduction signal input to said equalization means.

10. The information reproducing apparatus according to claim 9, wherein said modulation means comprising:
 a plurality of modulation tables applying different modulation processing to output from said error correction means, conversion means for converting each output from this plurality of modulation tables to regular polarity data and reverse polarity data, correlation operation means for computing a correlation among regular and reverse polarity data converted by this conversion means and discrimination data output from said discrimination means, and comparison and selection means for comparing operation results from this correlation operation means and selectively outputting data having practically a higher correlation with said discrimination data.

11. An information reproducing apparatus for reproducing digital data recorded on an information recording medium comprising:
 an equalization section for equalizing a reproduction signal read from said information recording medium based on an equalization coefficient, a discrimination section for discriminating output from this equalization section, an error correction section for correcting an error in output from this discrimination section, a modulation section for creating a plurality of modulation data candidates for output from this error correction section and, out of this plurality of modulation data candidates, outputting modulation data having practically a higher correlation with discrimination data obtained from said discrimination section, an ideal signal generation section for generating an ideal signal when modulation data output from this modulation section is ideally equalized, an operation section for computing an equalization error based on output from this ideal signal generation section and output from said equalization section, and a coefficient control section for generating an equalization coefficient supplied to said equalization section based on output from this operation section and a reproduction signal input to said equalization section.

12. The information reproducing apparatus according to claim 11, wherein said modulation section comprising:
 a plurality of modulation tables applying different modulation processing to output from said error correction section, a conversion section for converting each output from this plurality of modulation tables to regular polarity data and reverse polarity data, a correlation operation section for computing a correlation among regular and reverse polarity data converted by this conversion section and discrimination data output from said discrimination section, and a comparison and selection section for comparing operation results from this correlation operation section and selectively outputting data having practically a higher correlation with said discrimination data.

13. An information reproducing method for reproducing digital data recorded on an information recording medium comprising:

an equalization step of equalizing a reproduction signal read from said information recording medium based on an equalization coefficient, a discrimination step of discriminating an equalization signal obtained at this equalization step, an error correction step of correcting an error in discrimination data obtained at this discrimination step, a modulation step of creating a plurality of modulation data candidates for data obtained at this error correction step and, out of this plurality of modulation data candidates, outputting modulation data having practically a higher correlation with discrimination data obtained at said discrimination step, an ideal signal generation step of generating an ideal signal when modulation data obtained at this modulation step is ideally equalized, an operation step of computing an equalization error based on an ideal signal obtained at this ideal signal generation step and an equalization signal obtained at said equalization step, and a coefficient control step of generating an equalization coefficient supplied to said equalization step based on an equalization error obtained at this operation step and a reproduction signal before equalization at said equalization step.

14. The information reproducing method according to claim 13, wherein said modulation step comprising:

a modulation step of modulating data obtained at said error correction step by using a plurality of different modulation tables, a conversion step of converting a plurality of modulation data obtained at this modulation step to regular polarity data and reverse polarity data, a correlation operation step of computing a correlation among regular and reverse polarity data converted at this conversion step and discrimination data obtained at said discrimination step, and a comparison and selection step of comparing operation results obtained at this correlation operation step and selectively outputting data having practically a higher correlation with said discrimination data.

* * * * *